(12) United States Patent
Chang et al.

(10) Patent No.: US 12,297,323 B2
(45) Date of Patent: May 13, 2025

(54) POLYSILOXANE VINYLIC CROSSLINKERS WITH HIGH REFRACTIVE INDEX

(71) Applicant: Alcon Inc., Fribourg (CH)

(72) Inventors: Frank Chang, Cumming, GA (US); Thomas M. Moy, Cumming, GA (US); Adam K. Sniady, Lilburn, GA (US)

(73) Assignee: Alcon Inc., Fribourg (CH)

( * ) Notice: Subject to any disclaimer, the term of this patent is extended or adjusted under 35 U.S.C. 154(b) by 671 days.

(21) Appl. No.: 17/700,734

(22) Filed: Mar. 22, 2022

(65) Prior Publication Data

US 2022/0306810 A1   Sep. 29, 2022

Related U.S. Application Data

(60) Provisional application No. 63/164,982, filed on Mar. 23, 2021.

(51) Int. Cl.
| | |
|---|---|
| C08G 77/442 | (2006.01) |
| C08G 77/20 | (2006.01) |
| C08G 77/60 | (2006.01) |
| G02B 1/04 | (2006.01) |
| C08G 77/00 | (2006.01) |

(52) U.S. Cl.
CPC ........... C08G 77/442 (2013.01); C08G 77/20 (2013.01); C08G 77/60 (2013.01); G02B 1/043 (2013.01); C08G 77/80 (2013.01)

(58) Field of Classification Search
CPC ...... C08G 77/442; C08G 77/20; C08G 77/60; G02B 1/04
USPC ........................................................ 523/107
See application file for complete search history.

(56) References Cited

U.S. PATENT DOCUMENTS

| | | |
|---|---|---|
| 3,408,429 A | 10/1968 | Wichterle |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,259,467 A | 3/1981 | Keogh |
| 4,260,725 A | 4/1981 | Keogh |
| 4,261,875 A | 4/1981 | LeBoeuf |
| 4,268,132 A | 5/1981 | Neefe |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert |
| 4,401,371 A | 8/1983 | Neefe |
| 4,444,711 A | 4/1984 | Schad |
| 4,460,534 A | 7/1984 | Boehm et al. |
| 4,486,577 A | 12/1984 | Mueller |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,929,693 A | 5/1990 | Akashi et al. |
| 4,954,586 A | 9/1990 | Nobuyuki et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono |
| 5,070,170 A | 12/1991 | Robertson |
| 5,070,215 A | 12/1991 | Bambury et al. |
| 5,079,319 A | 1/1992 | Mueller |
| 5,098,546 A | 3/1992 | Kawashima et al. |
| 5,156,726 A | 10/1992 | Nakada et al. |
| 5,166,345 A | 11/1992 | Akashi et al. |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |

(Continued)

FOREIGN PATENT DOCUMENTS

| | | |
|---|---|---|
| EP | 0632329 A1 | 1/1995 |
| EP | 2374832 A1 | 10/2011 |

(Continued)

OTHER PUBLICATIONS

Scott C. Blackburn et al., "Synthesis of High Refractive Index Silicone Materials Incorporating Aromatic Moieties with Adjacent Linkage Groups for Flexible Electronic Displays", Silicon, vol. 8, 2016, pp. 541-552.
K. J. Sax, et al. "Preparation and Infrared Absorption Spectra of Some Phenyl Ethers", J. Org. Chem., 1960, vol. 25 (9), pp. 1590-1595.
Rafiza Ramli et al., "Synthesis and Studies on the Effect of Phenyl Side-Chain Content on Refractive Index of Polysiloxane Resin", Applied Mechanics and Materials, vols. 754-755 (2015) pp. 881-885.

(Continued)

*Primary Examiner* — Deve V Hall
(74) *Attorney, Agent, or Firm* — Jian Zhou

(57) ABSTRACT

The invention provides a class of high RI polysiloxane vinylic crosslinkers. Each of the polysiloxane vinylic crosslinkers of the invention comprise (1) a polysiloxane segment comprising dimethylsiloxane units and aryl-containing siloxane units each having one methyl substituent and one organic substituent having up to 45 carbon atoms and at least one aryl moiety which is linked to Si atom through a linker having at least 2 (preferably 3) carbon atoms; (2) ethylenically-unsaturated groups. The invention also provides an insert or silicone hydrogel contact lens which comprises a crosslinked polymeric material comprising repeating units of at least one of such a class of high RI polysiloxane vinylic crosslinkers.

20 Claims, 1 Drawing Sheet

(56) References Cited

U.S. PATENT DOCUMENTS

| | | |
|---|---|---|
| 5,449,729 A | 9/1995 | Lai |
| 5,451,617 A | 9/1995 | Lai |
| 5,486,579 A | 1/1996 | Lai |
| 5,508,317 A | 4/1996 | Müller |
| 5,527,925 A | 6/1996 | Chabrecek et al. |
| 5,545,830 A | 8/1996 | Ziemelis |
| 5,583,163 A | 12/1996 | Müller |
| 5,760,100 A | 6/1998 | Nicolson et al. |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger |
| 5,962,548 A | 10/1999 | Vanderlaan |
| 5,981,675 A | 11/1999 | Valiant, Jr. |
| 6,017,121 A | 1/2000 | Chateau et al. |
| 6,019,914 A | 2/2000 | Lokshin et al. |
| 6,039,913 A | 3/2000 | Hirt |
| 6,113,814 A | 9/2000 | Gemert et al. |
| 6,149,841 A | 11/2000 | Kumar |
| 6,166,236 A | 12/2000 | Bambury |
| 6,296,785 B1 | 10/2001 | Nelson et al. |
| 6,348,604 B1 | 2/2002 | Nelson et al. |
| 6,723,816 B2 | 4/2004 | Salamone et al. |
| 6,762,264 B2 | 7/2004 | Kunzler |
| 6,851,805 B2 | 2/2005 | Blum et al. |
| 6,867,245 B2 | 3/2005 | Iwata |
| 7,009,023 B2 | 3/2006 | Salamone et al. |
| 7,214,809 B2 | 5/2007 | Zanini |
| 7,423,074 B2 | 9/2008 | Lai |
| 7,490,936 B2 | 2/2009 | Blum et al. |
| 7,556,750 B2 | 7/2009 | Xiao et al. |
| 7,584,630 B2 | 9/2009 | Van Gemert |
| 7,605,190 B2 | 10/2009 | Moszner et al. |
| 7,883,207 B2 | 2/2011 | Iyer |
| 7,999,989 B2 | 8/2011 | Asai et al. |
| 8,154,804 B2 | 4/2012 | McGinn et al. |
| 8,158,037 B2 | 4/2012 | Chopra et al. |
| 8,215,770 B2 | 7/2012 | Blum et al. |
| 8,348,424 B2 | 1/2013 | Pugh et al. |
| 8,415,405 B2 | 4/2013 | Maggio |
| 8,475,529 B2 | 7/2013 | Clarke |
| 8,480,227 B2 | 7/2013 | Qiu et al. |
| 8,529,057 B2 | 9/2013 | Qiu |
| 8,614,261 B2 | 12/2013 | Iwata |
| 8,658,748 B2 | 2/2014 | Liu et al. |
| 8,697,770 B2 | 4/2014 | Duis et al. |
| 8,741,188 B2 | 6/2014 | Chopra et al. |
| 8,835,525 B2 | 9/2014 | Kuyu |
| 8,874,182 B2 | 10/2014 | Etzkorn et al. |
| 8,993,651 B2 | 3/2015 | Chang |
| 9,052,438 B2 | 6/2015 | Xiao et al. |
| 9,097,840 B2 | 8/2015 | Chang et al. |
| 9,097,916 B2 | 8/2015 | Chopra et al. |
| 9,103,965 B2 | 8/2015 | Chang |
| 9,176,332 B1 | 11/2015 | Etzkorn et al. |
| 9,217,813 B2 | 12/2015 | Liu |
| 9,465,234 B2 | 10/2016 | Chopra et al. |
| 9,475,827 B2 | 10/2016 | Chang et al. |
| 9,618,773 B2 | 4/2017 | Clarke |
| 9,904,074 B2 | 2/2018 | Duis et al. |
| 10,081,697 B2 | 9/2018 | Huang et al. |
| 10,197,707 B2 | 2/2019 | Xiao et al. |
| 10,203,521 B2 | 2/2019 | Pugh et al. |
| 10,209,534 B2 | 2/2019 | Alli et al. |
| 10,301,451 B2 | 5/2019 | Jing et al. |
| 10,465,047 B2 | 11/2019 | Jing et al. |
| 2004/0141150 A1 | 7/2004 | Roffman et al. |
| 2004/0212779 A1 | 10/2004 | Dahi et al. |
| 2008/0208335 A1 | 8/2008 | Blum et al. |
| 2009/0091818 A1 | 4/2009 | Haddock et al. |
| 2009/0244477 A1 | 10/2009 | Pugh et al. |
| 2010/0072643 A1 | 3/2010 | Pugh et al. |
| 2010/0076553 A1 | 3/2010 | Pugh et al. |
| 2011/0157544 A1 | 6/2011 | Pugh et al. |
| 2012/0120365 A1 | 5/2012 | Legerton et al. |
| 2012/0140167 A1 | 6/2012 | Blum |
| 2012/0234453 A1 | 9/2012 | Pugh et al. |
| 2014/0276481 A1 | 9/2014 | Pugh et al. |
| 2015/0145155 A1 | 5/2015 | Pugh et al. |
| 2019/0153141 A1 | 5/2019 | Chang et al. |

FOREIGN PATENT DOCUMENTS

| | | | |
|---|---|---|---|
| JP | H07505914 A | 6/1995 | |
| JP | H08253591 A | 10/1996 | |
| JP | H09157543 A | 6/1997 | |
| JP | 2018538395 A | 12/2018 | |
| JP | 2023518030 A | 4/2023 | |
| WO | 9321258 A1 | 10/1993 | |
| WO | 2015023001 A1 | 2/2015 | |
| WO | 2017103791 A1 | 6/2017 | |
| WO | WO-2018224976 A1 * | 12/2018 | ....... B29D 11/00038 |
| WO | 2021186383 A1 | 9/2021 | |

OTHER PUBLICATIONS

S. Marcinkiewicz et al., "The relation between the Claisen rearrangement of allyl ethers and their electronic structure: Rearrangement of N-allylamines", Tetrahedron, vol. 14, Issues 3-4, 1961, pp. 208-222.

* cited by examiner

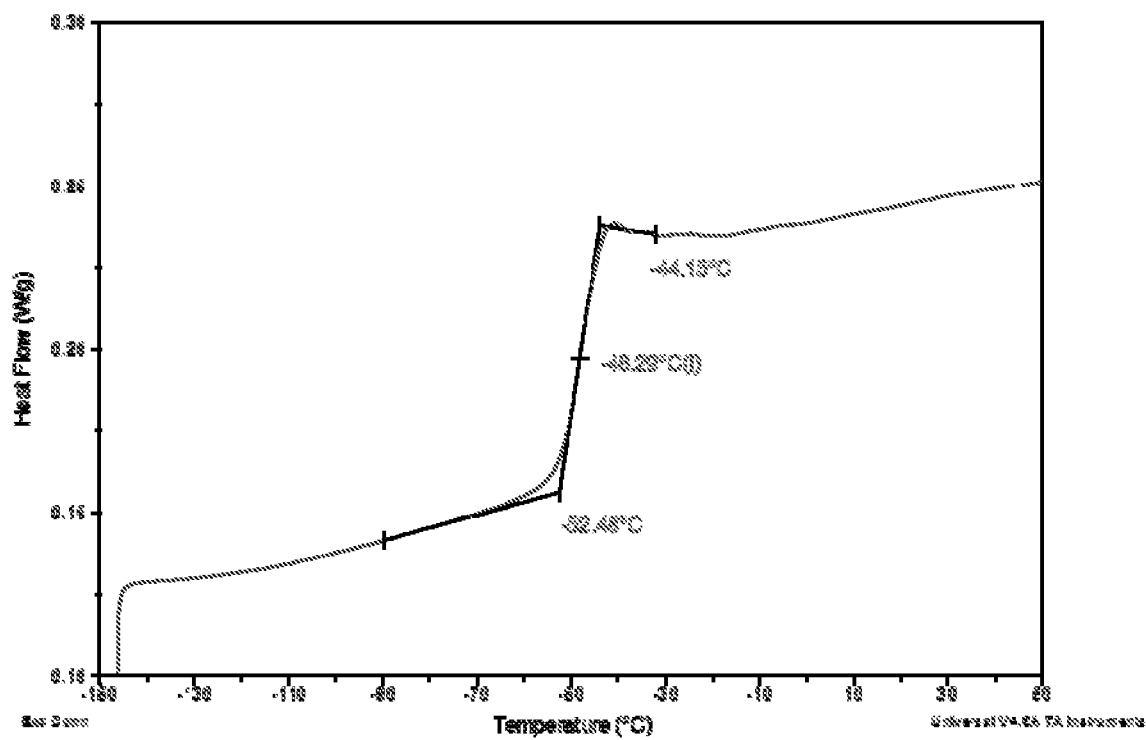

POLYSILOXANE VINYLIC CROSSLINKERS WITH HIGH REFRACTIVE INDEX

This application claims the benefit under 35 USC § 119 (e) of U.S. provisional application No. 63/164,982 filed on 23 Mar. 2021, incorporated by references in its entirety.

The present invention relates to high refractive index (RI) polysiloxane vinylic crosslinkers each having one or more aryl-containing siloxane units each having one methyl substituent and one organic substituent having at least one aryl moiety which is linked to Si atom through a flexible linker and to their uses in making high RI inserts and high RI silicone hydrogel contact lenses.

BACKGROUND OF THE INVENTION

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,490,936, 7,883,207, 8,154,804, 8,215,770, 8,348,424, 8,874,182, 9,176,332, 9,618,773, 10,203,521, and 10,209,534; and U.S. Pat. Appl. Pub. Nos. 20040141150, 20040212779, 2008/0208335, 2009/0091818, 20090244477, 2010/0072643, 2010/0076553, 20110157544, 2012/0120365, 2012/0140167, 2012/0234453, 2014/0276481, and 2015/0145155).

Inserts are typically made of a non-hydrogel material that cannot absorb water and is a non-water-swellable material and has a low oxygen permeability and a relatively-low refractive index. A high oxygen permeability of an insert is required to have minimal adverse effects upon corneal health. A high refractive index would be desirable for imparting a higher optical performance, such as, diffractive multifocal optics, to embedded contact lenses. It would be desirable to have inserts made of a material having a high oxygen permeability and high refractive index.

SUMMARY OF THE INVENTION

The present invention, in one aspect, provides a polysiloxane vinylic crosslinker having a high refractive index (RI) and a relative low glass transition temperature (Tg). The polysiloxane vinylic crosslinker of the invention comprises a polysiloxane segment comprising dimethylsiloxane units, aryl-containing siloxane units having one methyl substituent and one organic substituent having at least one aryl moiety which is linked to Si atom through a linker having at least two (preferably three) carbon atoms, and ethylenically-unsaturated groups.

In another aspect, the invention provides an insert made of a crosslinked polymeric material comprising repeating units of a high RI polysiloxane vinylic crosslinker of the invention.

In a further aspect, the invention provide a silicone hydrogel contact lens comprising a silicone hydrogel bulk material including repeating units of a high RI polysiloxane vinylic crosslinker of the invention.

In a still further aspect, the invention provides an embedded silicone hydrogel contact lens comprising a silicone hydrogel bulk material and an insert which is made of a crosslinked polymeric material comprising units of a high RI polysiloxane vinylic crosslinker of the invention (described above) and which is embedded within the silicone hydrogel bulk material.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

BRIEF DESCRIPTION OF DRAWINGS

FIG. 1 shows a DSC diagram obtained for a high RI polysiloxane vinylic crosslinker of the invention by using Differential Scanning calorimetry (DSC).

DESCRIPTION OF PREFERRED EMBODIMENTS

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case.

A "silicone hydrogel contact lens" refers to a contact lens comprising a silicone hydrogel material as bulk material (i.e., a silicone hydrogel bulk material).

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" interchangeably refers to a silicone-containing hydrogel comprising repeating units of at least one silicone-containing monomer and/or silicone-containing vinylic crosslinker and repeating units of at least one hydrophilic vinylic monomer. It is typically formed by copolymerization of a polymerizable composition comprising at least one silicone-containing monomer and/or silicone-containing vinylic crosslinker and at least one hydrophilic vinylic monomer.

As used in this application, the term "non-silicone hydrogel" refers to a hydrogel that is theoretically free of silicon.

An "embedded silicone hydrogel contact lens" refers a silicone hydrogel contact lens comprising at least one insert which is made of a non-hydrogel material and embedded within the silicone hydrogel material as the major lens material of the contact lens.

An "insert" refers to any 3-dimensional article which is made of a non-hydrogel material and has a dimension of at least 5 microns but is smaller in dimension sufficient to be embedded in a silicone hydrogel contact lens. In accordance with the invention, a non-hydrogel material can be any material which can absorb less than 5% (preferably about 4% or less, more preferably about 3% or less, even more preferably about 2% or less) by weight of water when being fully hydrated.

In accordance with the invention, an insert of the invention has a thickness less than any thickness of an embedded silicone hydrogel contact lens in the region where the insert is embedded. An insert can be any object have any geometrical shape and can have any desired functions. Examples of preferred inserts include without limitation thin rigid disks having curved surfaces for providing rigid center optics for masking astigmatism like a rigid gas permeable (RGP) contact lens, multifocal lens inserts, photochromic inserts, cosmetic inserts having color patterns printed thereon, etc.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.5% by weight at room temperature (i.e., a temperature of about 21° C. to about 27° C.).

The term "insoluble", in reference to a compound or material in a solvent, means that the compound or material can be dissolved in the solvent to give a solution with a concentration of less than 0.01% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

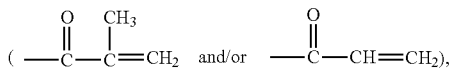

vinyloxycarbonylamino

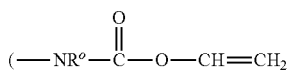

in which R° is H or $C_1$-$C_4$ alkyl), vinyloxycarbonyloxy

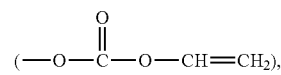

vinylaminocarbonylamino

in which R° is H or $C_1$-$C_4$ alkyl), vinylaminocarbonyloxy

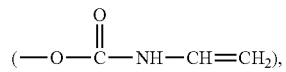

allyl, vinyl, styrenyl

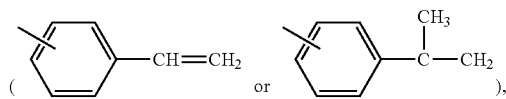

or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

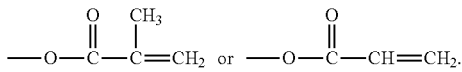

An "(meth)acrylamido monomer" refers to a vinylic monomer having one sole group of

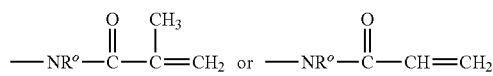

in which R° is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

The term "ene group" refers to a monovalent radical of $CH_2$=CH— or $CH_2$=$CCH_3$— that is not covalently attached to an oxygen or nitrogen atom or a carbonyl group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A siloxane, which often also described as a silicone, refers to a molecule having at least one moiety of —Si—O—Si— where each Si atom carries two organic groups as substituents.

A "silicone-containing vinylic monomer or crosslinker" or a "siloxane-containing vinylic monomer or crosslinker" interchageably refers to a vinylic monomer or crosslinker having at least one moiety of —Si—O—Si— where each Si atom carries at least two substituents (organic groups).

A "polysiloxane segment" or "polydiorganosiloxane segment" interchangeably refers to a polymer chain segment (i.e., a divalent radical) of

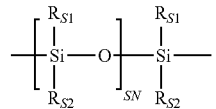

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl; and an organic radical having up to 45 carbon atoms.

A "polydiorganosiloxane vinylic crosslinker" or "polysiloxane vinylic crosslinker" interchangeably refers to a compound comprising at least one polysiloxane segment and at least two ethylenically-unsaturated groups.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

The term "terminal ethylenically-unsaturated group" refers to one ethylenically-unsaturated group at one of the two ends of the main chain (or backbone) of an organic compound as known to a person skilled in the art.

A "blending vinylic monomer" refers to a vinylic monomer capable of dissolving both hydrophilic and hydrophobic components of a polymerizable composition to form a solution.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

"Post-curing surface treatment", in reference to a silicone hydrogel bulk material or a SiHy contact lens, means a surface treatment process that is performed after the silicone hydrogel bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a silicone hydrogel (SiHy) contact lens or a SiHy lens bulk material as well known to a person skilled in the art.

In general, the invention is directed to a class of high RI polysiloxane vinylic crosslinkers which each comprise (1) a polysiloxane segment comprising dimethylsiloxane units and aryl-containing siloxane units each having one methyl substituent and one organic substituent having up to 45 carbon atoms and at least one aryl moiety which is linked to Si atom through a linker having at least two (preferably at least three) carbon atoms; (2) ethylenically-unsaturated groups.

There are some potential unique features associated with use of high RI polysiloxane vinylic crosslinkers of the invention in making an insert or SiHy contact lens having a relatively high RI (refractive index).

First, a high RI polysiloxane vinylic crosslinker of the invention is useful for making inserts or SiHy contact lens which have high refractive index (RI 1.50) and relatively high oxygen permeability. Typically, a polydimethylsiloxane has RI value of 1.38-1.42. Such a polydimethylsiloxane can be used to make an insert or SiHy contact lens having a relatively high oxygen permeability, but would not be suitable for making an insert or SiHy contact lens having a high RI. In contrast, a high RI polysiloxane vinylic crosslinker of the invention comprises aryl moieties for imparting high RI but also still comprises dimethylsiloxane units for imparting a relatively high oxygen permeability to resultant inserts or SiHy contact lenses. An insert with a high RI and a high oxygen permeability can be used to make embedded diffractive multifocal silicone hydrogel contact lenses. A high RI SiHy contact lens can have a thinner thickness so as to have a high oxygen transmissibility.

Second, in a high RI polysiloxane vinylic crosslinker of the invention, each aryl moiety is not directly linked to Si atoms in siloxane units, but instead is linked to a Si atom through a flexible linker. With such a flexible linker, the aryl moiety can more easily move around and a high RI polysiloxane vinylic crosslinker of the invention can have a relatively low glass transition temperature (Tg). Inserts or lenses made from a polysiloxane with a high Tg can be more brittle and more susceptible to cracking.

The present invention, in one aspect, provides a high RI polysiloxane vinylic crosslinker. The high RI polysiloxane vinylic crosslinker of the invention comprises: (1) a polysiloxane segment comprising dimethylsiloxane units and aryl-containing siloxane units each having one methyl substituent and one organic substituent having up to 45 carbon atoms and at least one aryl moiety which is linked to Si atom through a linker having at least 2 (preferably 3) carbon atoms; and (2) ethylenically-unsaturated groups (preferably (meth)acryloyl groups). The high RI polysiloxane vinylic crosslinker of the invention has a RI of at least 1.48 (preferably at least 1.51, more preferably at least 1.54, even more preferably 1.57) and a $T_g$ of about 0° C. or lower (preferably about −5.0° C. or lower, more preferably about −10.0° C. or lower, even more preferably about −20.0° C. or lower).

In a preferred embodiment, the polysiloxane segment comprises at least 30% by mole (preferably at least 40% by mole, more preferably at least 50% by mole, even more preferably at least 60% by mole, particularly preferable at least 70% by mole) of the aryl-containing siloxane units.

In another preferred embodiment, a high RI polysiloxane vinylic crosslinker of the invention can have a number average molecular weight of at least 1000 Daltons (preferably from 1500 Daltons to 100000 Daltons, more preferably from 2000 to 80000 Daltons, even more preferably from 2500 to 60000 Dalton).

In accordance with the invention, the high RI polysiloxane vinylic crosslinker is preferably defined by formula (1)

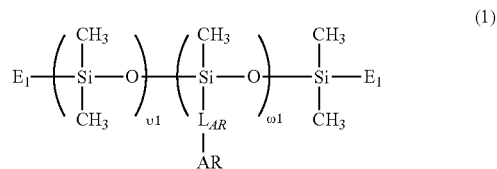

in which:
υ1 is an integer of from 1 to 400 (preferably from 3 to 350, more preferably from 5 to 300, even more preferably from 10 to 250);
ω1 is an integer of from 1 to 800 (preferably from 5 to 700, more preferably from 10 to 600, even more preferably from 15 to 500);
$E_1$ is a monovalent radical of

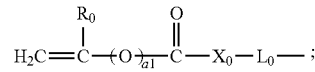

$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

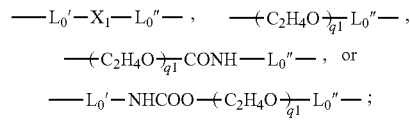

$L_0'$ is a $C_2$-$C_8$ alkylene divalent radical;
$L_0''$ is $C_3$-$C_8$ alkylene divalent radical;
$X_1$ is —O—, —$NR_{N1}$—, —NHCOO—, —OCONH—, —$CONR_{N1}$—, or —$NR_{N1}CO$—;
q1 is an integer of 1 to 10;
AR is an aryl radical;
$L_{AR}$ is a divalent radical of

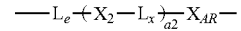

$L_e$ is a divalent radical of

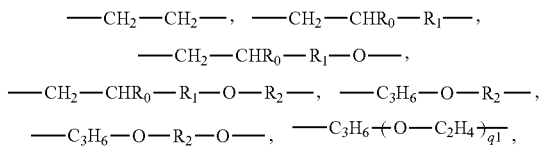

-continued

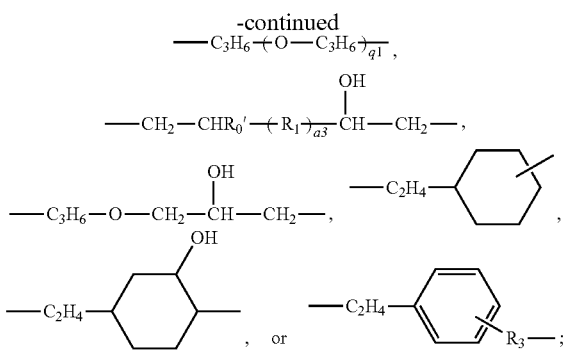

a2 is zero or 1 or 2;
a3 is zero or 1;
$R_1$ is a linear or branched $C_1$-$C_{10}$ alkylene divalent radical which is optionally substituted with $C_1$-$C_4$ alkoxy group, hydroxyl group, carboxyl group, amino group, oxo group, or combinations thereof;
$R_2$ is a linear or branched $C_1$-$C_{10}$ alkylene divalent radical;
$R_3$ is a direct bond or a linear or branched $C_1$-$C_4$ alkylene divalent radical;
$X_{AR}$ and each $X_2$ independently of others are a covalent bond, a linear or branched $C_1$-$C_4$ alkylene divalent radical, or a covalent linkage of

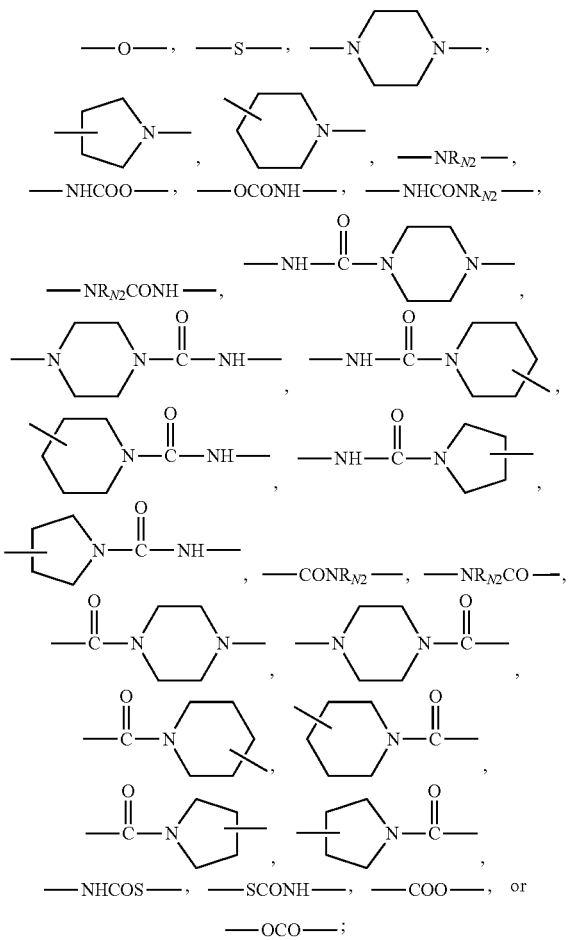

RN2 is hydrogen, a linear or branched $C_1$-$C_6$ alkyl, cyclohexyl, cyclopentyl, a substituted or unsubstituted phenyl, or a substituted- or unsubstituted-phenyl-$C_1$-$C_6$ alkyl; each $L_x$ independently is a linear or branched $C_1$-$C_{10}$ alkylene divalent radical which optionally has one or more hydroxyl or $C_1$-$C_4$-alkoxy groups or $C_1$-$C_4$-acylamino groups,

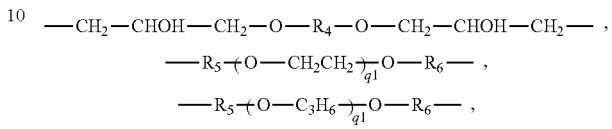

or a divalent radical which optionally has one or more hydroxyl or $C_1$-$C_4$-alkoxy groups and is obtained by removal of two hydrogen atoms from two different atoms of a hydrocarbon that has up to 20 carbon atoms and comprises at least one divalent radical selected from the group consisting of cycloalkylene radical, substituted cycloalkylene radical, phenylene radical, substituted phenylene radical, cycloheteroalkylene radical, and substituted cycloheteroalkylene radical; and
each $R_4$, $R_5$ and $R_6$ independent of one another are a linear or branched $C_1$-$C_{10}$ alkylene divalent radical which has zero or one hydroxyl group.

In a preferred embodiment, in formula (1) a1 is zero and then $E_1$ is a monovalent radical of

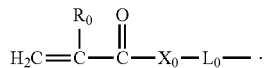

In a preferred embodiment, ω1/(ν1+ω1) is from about 0.30 to about 0.95 (preferably from about 0.40 to about 0.90, more preferably from about 0.50 to about 0.90, even more preferably from about 0.60 to about 0.85).

In a preferred embodiment, AR is a phenyl group, a substituted phenyl group, a naphthyl group, a substituted naphthyl group, an anthracenyl group, a substituted anthracenyl group, a phenanthryl group, or a substituted phenanthryl group.

In a preferred embodiment, AR is a group of

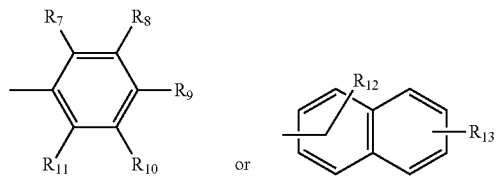

in which $R_7$, $R_8$, $R_9$, $R_{10}$, $R_{11}$, $R_{12}$, and $R_{13}$ independent of one another are H, Cl, Br, F, $CF_3$, $CCl_3$, $C_1$-$C_5$ alkyl, $C_1$-$C_5$ alkoxy, $C_2$-$C_5$ acyloxy, OH, phenyl, phenoxy, benzyloxy, phenylcarbonyl, phenoxycarbonyl, phenylcarboxy (phenylcarbonyloxy), or naphthyl.

A polysiloxane vinylic crosslinker of formula (1) can be prepared in a two-step or three-step process.

According to a two-step process, a hydrosiloxane-containing polysiloxane of formula (2) is obtained in the first step according to any known procedures.

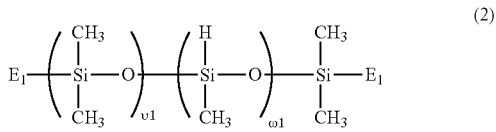

(2)

in which $E_1$, $v1$, and $\omega1$ are as defined above for formula (1).

In accordance with the two-step process, a hydrosiloxane-containing polysiloxane of formula (2) can be prepared from polymerization of a mixture of octamethylcyclotetrasiloxane (D4) and 1,3,5,7-tetramethylcyclotetrasiloxane (H4) in presence of 1,3-bis(E1 group)-terminated tetramethyldisiloxane (e.g., 1,3-bis[3-(meth)acryloxypropyl] tetramethyldisiloxane, 1,3-bis[3-(meth)acrylamidopropyl] tetramethyldisiloxane, or the like) as a chain end block and in the presence of a catalyst. By controlling the molar ratio of D4 to H4, a desired value of $v1/\omega1$ can be obtained. It is understood that 1,3-bis(E1 group)-terminated tetramethyldisiloxane can be prepared from 1,3-bis(hydroxyalkyl)tetramethyldisloxane (e.g., 1,3-bis(hydroxypropyl)tetramethyldisloxane) or 1,3-bis(aminoalkyl)tetramethyldisloxane (e.g., 1,3-bis(aminopropyl)tetramethyldisloxane), e.g., by reacting one of them with a (meth)acryloyl chloride or a vinyl isocyanate (or isopropenyl isocyanate).

In the second step of the two-step process, a hydrosiloxane-containing polysiloxane of formula (2) can be reacted with an aryl-containing ene monomer (i.e., an ene monomer containing a phenyl group, a substituted phenyl group, a naphthyl group or a substituted naphthyl group) in a platinum-catalyzed hydrosilylation reaction as known to a person skilled in the art, to form a polysiloxane vinylic crosslinker of formula (1).

Any aryl-containing ene monomers can be used in preparing a polysiloxane vinylic crosslinker of formula (1), so long as the aryl-containing ene monomers comprise a phenyl group, a substituted phenyl group, a naphthyl group, a substituted naphthyl group, an anthracenyl group, a substituted anthracenyl group, a phenanthryl group, or a substituted phenanthryl group. Examples of such aryl-containing ene monomers include without limitation vinyl naphthalenes, vinyl anthracenes, vinyl phenanthrenes, vinyl pyrenes, vinyl biphenyls, vinyl terphenyls, vinyl phenyl naphthalenes, vinyl phenyl anthracenes, vinyl phenyl phenanthrenes, vinyl phenyl pyrenes, vinyl phenyl terphenyls, phenoxy styrenes, phenyl carbonyl styrenes, phenyl carboxy styrenes, phenoxy carbonyl styrenes, allyl naphthalenes, allyl anthracenes, allyl phenanthrenes, allyl pyrenes, allyl biphenyls, allyl terphenyls, allyl phenyl naphthalenes, allyl phenyl anthracenes, allyl phenyl phenanthrenes, allyl phenyl pyrenes, allyl phenyl terphenyls, allyl phenoxy benzenes, allyl(phenylcarbonyl)benzenes, allyl phenoxy benzenes, allyl(phenyl carbonyl)benzenes, allyl(phenylcarboxy)benzenes, allyl phenyl ether, allyl benzyl ether, and allyl(phenoxy carbonyl)benzenes.

Various aryl-containing ene monomers can be obtained from commercial suppliers or prepared according to known methods. Examples of preferred aryl-containing ene monomers include without limitation styrene, 2,5-dimethylstyrene, 2-(trifluoromethyl)styrene, 2-chlorostyrene, 3,4-dimethoxystyrene, 3-chlorostyrene, 3-bromostyrene, 3-vinylanisole, 3-methylstyrene, 4-bromostyrene, 4-tert-butylstyrene, 2,3,4,5,6-pentanfluorostyrene, 2,4-dimethylstyrene, 1-methoxy-4-vinylbenzene, 1-chloro-4-vinylbenzene, 1-methyl-4-vinylbenzene, 1-(chloromethyl)-4-vinylbenzene, 1-(bromomethyl)-4-vinylbenzene, 3-nitrostyrene, 1,2-vinyl phenyl benzene, 1,3-vinyl phenyl benzene, 1,4-vinyl phenyl benzene, 4-vinyl-1,1'-(4'-phenyl)biphenylene, 1-vinyl-4-(phenyloxy)benzene, 1-vinyl-3-(phenyloxy)benzene, 1-vinyl-2-(phenyloxy)benzene, 1-vinyl-4-(phenyl carbonyl) benzene, 1-vinyl-3-(phenylcarboxy)benzene, 1-vinyl-2-(phenoxycarbonyl)benzene, allyl phenyl ether, allyl benzyl ether, 2-biphenylylallyl ether, allyl 4-phenoxyphenyl ether, allyl 2,4,6-tribromophenyl ether, allyl phenyl carbonate, 1-allyloxy-2-trifluoromethylbenzene, allylbenzene, 1-phenyl-2-prop-2-enylbenzene, 4-phenyl-1-butene, 4-phenyl-1-butene-4-ol, 1-(4-methylphenyl)-3-buten-1-ol, 1-(4-chlorophenyl)-3-buten-1-ol, 4-allyltoluene, 1-allyl-4-fluorobenzene, 1-allyl-2-methylbenzene, 1-allyl-3-methylbenzene, 1-allyl-3-methylbenzene, 2-allylanisole, 4-allylanisole, 1-allyl-4-(trifluromethyl)benzene, allylpentafluorobenzene, 1-allyl-2-methoxybenzene, 4-allyl-1,2-dimethoxybenzene, 2-allylphenol, 2-allyl-6-methylphenol, 4-allyl-2-methoxyphenol, 2-allyloxyanisole, 4-allyl-2-methoxyphenyl acetate, 2-allyl-6-methoxyphenol, 1-allyl-2-bromobezene, alpha-vinylbenzyl alcohol, 1-phenyl-3-butene-1-one, allylbenzyl ether, (3-allyloxy)propyl) benzene, allyl phenylethyl ether, 1-benzyloxy-4-pentene, (1-allyloxy)ethyl)benzene, 1-phenylallyl ethyl ether, (2-methyl-2-(2-propenyloxy)propyl) benzene, ((5-hexenyloxy)methyl)benzene, 1-allyloxy-4-propoxybenzene, 1-phenoxy-4-(3-prop-2-enoxypropoxy)benzene, 6-(4'-Hydroxyphenoxy)-1-Hexene, 4-but-3-enoxyphenol, 1-allyloxy-4-butoxybenzene, 1-allyloxy-4-ethoxybenzene, 1-allyl-4-benzyloxybenzene, 1-allyl-4-(phenoxy)benzene, 1-allyl-3-(phenoxy)benzene, 1-allyl-2-(phenoxy)benzene, 1-allyl-4-(phenyl carbonyl)benzene, 1-allyl-3-(phenyl carboxy) benzene, 1-allyl-2-(phenoxycarbonyl) benzene, 1,2-allyl phenyl benzene, 1,3-allyl phenyl benzene, 1,4-allyl phenyl benzene, 4-vinyl-1,1'-(4'-phenyl)biphenylene, 1-allyl-4-(phenyloxy)benzene, 1-allyl-3-(phenyloxy) benzene, 1-allyl-2-(phenyloxy)benzene, 1-allyl-4-(phenyl carbonyl)benzene, 1-allyl-3-(phenyl carboxy) benzene, and 1-allyl-2-(phenoxycarbonyl)benzene, 1-vinyl naphthylene, 2-vinyl naphthylene, 1-allyl naphthalene, 2-allyl naphthalene, allyl-2-naphthyl ether, 2-(2-methylprop-2-enyl)naphthalene, 2-prop-2-enylnaphthalene, 4-(2-naphthyl)-1-butene, 1-(3-butenyl)naphthalene, 1-allyl naphthalene, 2-allyl naphthalene, 1-allyl-4-napthyl naphthalene, 2-(allyloxy)-1-bromonaphthalene, 2-bromo-6-allyloxynaphthalene, 1,2-vinyl (1-naphthyl)benzene, 1,2-vinyl(2-naphthyl)benzene, 1,3-vinyl(1-naphthyl)benzene, 1,3-vinyl(2-naphthyl)benzene, 1,4-vinyl(1-naphthyl)benzene, 1,4-vinyl(2-naphthyl)benzene, 1-naphthyl-4-vinyl naphthalene, 1-allyl naphthalene, 2-allyl naphthalene, 1,2-allyl(1-naphthyl) benzene, 1,2-allyl (2-naphthyl)benzene, 1,3-allyl(1-naphthyl)benzene, 1,3-allyl(2-naphthyl)benzene, 1,4-allyl(1-naphthyl)benzene, 1,4-allyl(2-naphthyl)benzene, 1-allyl-4-napthyl naphthalene, 1-vinyl anthracene, 2-vinyl anthracene, 9-vinyl anthracene, 1-allyl anthracene, 2-allyl anthracene, 9-allyl anthracene, 9-pent-4-enylanthracene, 9-allyl-1,2,3,4-tetrachloroanthracene, 1-vinyl phenanthrene, 2-vinyl phenanthrene, 3-vinyl phenanthrene, 4-vinyl phenanthrene, 9-vinyl phenanthrene, 1-allyl phenanthrene, 2-allyl phenanthrene, 3-allyl phenanthrene, 4-allyl phenanthrene, 9-allyl phenanthrene, and combinations thereof.

In accordance with the three-step process, a hydrosiloxane-containing polysiloxane of formula (2) described above can be prepared according to the procedures described above.

In the second step of the three-step process, a hydrosiloxane-containing polysiloxane of formula (2) is reacted with an ene monomer containing a first reactive functional group ($E_e$) in a platinum-catalyzed hydrosilylation reaction as known to a person skilled in the art, to form a polysiloxane vinylic crosslinker having pendant reactive functional groups as represented by formula (3)

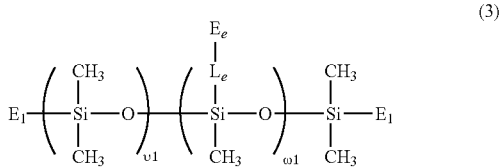

(3)

in which $E_1$, $v1$, $\omega1$, and $L_e$ are as defined above for formula (1) and $E_e$ is a first reactive functional group selected from the group consisting of

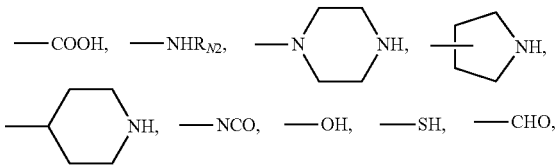

epoxy group

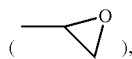

and aziridinyl

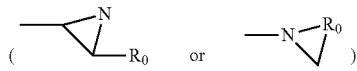

group.

Any ene monomers can be used in preparing a polysiloxane vinylic crosslinker of formula (3), so long as the ene monomers comprise a reactive functional group

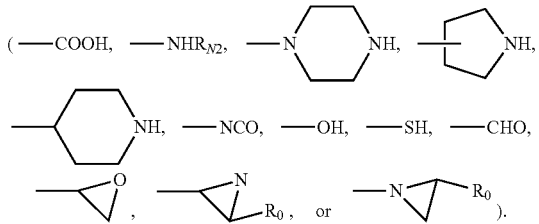

Various ene monomers having a reactive functional groups can be obtained from commercial suppliers or prepared according to known methods.

Examples of commercially available carboxyl-containing ene monomers include without limitation 3-butenoic acid, 4-pentenoic acid, 5-hexenoic acid, and 6-heptenoic acid. 2,2-dimethyl-4-pentanoic acid, 2-methyl-4-pentanoic acid, 2-propyl-4-pentanoic acid, 3-methyl-4-pentanoic acid, 4-vinylcyclohexanecarboxylic acid, 2-[4-(4-pentenyl)cyclohexyl] acetic acid, 4-propenylcyclohexanecarboxylic acid, 3-[2-(2-propenyl)cyclohexyl]propanoic acid, 2-(4-ethenyl-cyclohexyl)acetic acid, 4-[4-(2-propenyl)cyclohexyl]butanoic acid, 2-ethenylcyclohexabe-1-carboxylic acid, 2-, 3- or 4-vinylbenzoic acid, 4-(2-propenyl) benzoic acid, 2-allylbenzoic acid, (4-vinylphenyl)acetic acid, and 2-methyl-2-(4-vinylphenyl)propanoic acid.

Examples of commercially available ene monomers having a primary or secondary amino group include without limitation allylamine, 3-butenylamine, 4-pentenylamine, 1,1-dimethylallylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-octanamine, N-allyl-1-ecanamine, N-allyl-1-dodecanamine, N-allyl-1-heptanamine, N-allyl-ethylenediamine, N-allyl-cyclohexanamine, N-3-butenylcyclohexanamine, N-4-pentenylcyclohexanamine, N-5-hexenyl-cyclohexanamine, 1-amino-4-vinyl-cyclohexane, 1-allyl-2,5-dimethylpiperazine, 1-ally-piperazine, 4-vinylaniline, N-allylaniline, N-allyl-benzylamine, N-ally-α-methylbenzylaniline, 4-vinylpiperidine, 3-vinylpiperidine, 2-allylpyrrolidine, 3-vinylpyrrolidine, etc.

Examples of commercially available ene monomers having an isocyanato group include without limitation allyl isocyanate, 4-isocyanato-1-butene, 3-isocyanate-2-methylpropene, 3-isocyanate-1-butene, 3-isocyanate-3-methyl-1-butene, 3-isocyanate-2,3-dimethyl-1-butene, 4-isocyanate-2-methyl-1-butene, 4-isocyanate-3,3-dimethyl-1-butene, 3-isocyanate-3-methyl-1-pentene, 4-isocyanate-4-methyl-1-pentene, 5-isocyanate-1-pentene, 3-isocyanate-1-hexene, 3-isocyanate-5,5-dimethyl-1-hexene, 1-isocyanate-2-heptene, etc.

Examples of commercially available hydroxyl-containing ene monomers include without limitation allyl alcohol, 2-methyl-2-propen-1-ol, 3-buten-1-ol, 3-buten-2-ol, 3-methyl-3-buten-1-ol, 2-methyl-3-buten-2-ol, 2-methyl-3-buten-1-ol, 1-penten-3-ol, 4-penten-1-ol, 4-penten-2-ol, 1-hexen-3-ol, 5-hexen-1-ol, 5-hexen-2-ol, 3-methyl-1-hexen-3-ol, 5-methyl-1-hexen-3-ol, 1-hepten-3-ol, allyloxyethanol, di(ethylene glycol) monoallyl ether, poly(ethylene glycol) monoallyl ether, poly(propylen glycol) monoallyl ether, allyloxypropanol, 1-allyloxy-2-propanol, 4-allyloxy-1-butanol, 1-vinyl cyclohexanol, 2-vinyl cyclohexanol, 4-vinylcyclohexanol, 1-allylcycloheanol, 2-allycyclohexanol, 4-allylcyclohexanol, 4-vinylphenol, (4-vinyl phenyl)methanol, (4-vinylphenyl)ethanol, 3-(4-Vinylphenyl)-1-propanol, 1-(4-Vinylphenyl)-2-methyl-2-propanol, etc.

Examples of commercially available thiol-containing ene monomers include without limitation allyl mercaptan, 3-butene-1-thiol, 3-methyl-3-butene-1-thiol, 2-methyl-3-butene-1-thiol, 2-methyl-3-butene-2-thiol, 4-pentene-1-thiol, etc.

Examples of commercially available ene monomers having an aldehyde group include without limitation 3-butenal, 4-pentanal, 5-hexenal, 2,2-dimethyl-4-pentenal, 2-methyl-4-pentenal, etc.

Examples of commercially available epoxy-containing ene monomers include without limitation 3,4-epoxy-1-butene, 2-methyl-2-vinyloxirane, 3,4-epoxy-1-pentene, 4,5-epoxy-1-pentene, 1,2-epoxy-5-hexene, 1,2-epoxy-6-heptene, 1,2-epoxy-7-octene, 1,2-epoxy-8-nonene, 1,2-epoxy-9-decene, allyloxy glycidyl ether, and 2-methyl-2-vinyloxirane, 4-vinyl-1-cyclohexen-1,2-epoxide, etc.

Examples of commercially available ene monomers having an aziridinyl group include without limitation 2-vinylaziridine, 1-allyaziridine, N-allyl-2-methylaziridine, etc.

All of the above described commercially-available ene monomers can be used in the invention. Alternatively, ene monomers having a reactive functional group can be prepared by reacting a compound having two ene groups with a mercaptane having a reactive functional group (e.g., hydroxyl, primary amino, secondary amino, carboxyl, or ketone group) based on thiol-ene "click" reaction as known in the art.

In the third step, a polysiloxane vinylic crosslinker of formula (3) is reacted with an aryl-containing compound having a second reactive functional group (designated as "$E_{AR}$") selected from the group consisting of

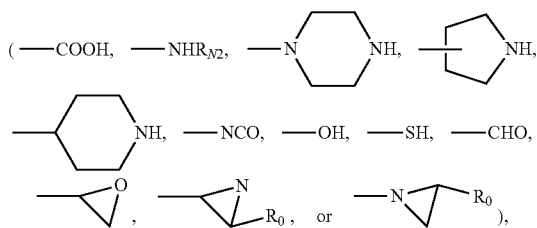

in the absence or presence of a coupling agent (i.e., having two of the reactive functional groups listed above) under well known coupling reaction conditions, to form a high RI polysiloxane vinylic crosslinker of formula (1).

Non-limiting examples of coupling reactions under various reaction conditions between a pair of matching co-reactive functional groups selected from the group preferably consisting of primary group, secondary amino group, hydroxyl group, carboxyl group, acid anhydride group, aldehyde group, isocyanate group, epoxy group, aziridine group, azlactone group and thiol group, are given below for illustrative purposes. A primary/secondary amino group reacts with aldehyde or ketone group to form a Schiff base which may further be reduced into an amine bond; a primary/secondary amino group —NHR (in which R is hydrogen or $C_1$-$C_6$ alkyl) reacts with an acid chloride or bromide group or with an acid anhydride group to form an amide linkage (—CO—NR—); an amino group —NHR reacts with a N-hydroxysuccinimide ester group to form an amide linkage; an amino group —NHR reacts with a carboxylic acid group in the presence of a coupling agent—carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide to form an amide linkage; an amino group —NHR reacts (ring-opening) with an azlactone group to form an alkylene-diamido linkage (—CONH-$CT_1T_2$—$(CH_2)_{p1}$—CONH—); an amino group —NHR reacts with an isocyanate group to form a urea linkage (—NR—C(O)—NH— with R as defined above); an amino group —NHR reacts with an epoxy or aziridine group to form an amine bond (—C—NR—); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage (—CONH-$CT_1T_2$—$(CH_2)_{p1}$—CO—S—); a thiol group reacts with an ene group or vinylsulfonyl group based on thiol-ene "click" reaction under thiol-ene reaction conditions to form a thioether linkage (—S—); a thiol group reacts with a (meth)acryloyl group based on Michael Addition under appropriate reaction conditions to form a thioether linkage.

The reactions conditions for the above described coupling reactions are taught in textbooks and are well known to a person skilled in the art.

In accordance with the invention, coupling agents, each of which has two reactive functional groups, may be used in the coupling reactions. A coupling agent having two reactive functional groups can be: a diisocyanate compound; a di-acid halide compound; a di-carboxylic acid compound; a di-carboxylic acid anhydride compound; a diamine compound; a diol compound; a di-epoxy compound; a di-aziridine compound; di-azlactone compound; a di-ene compound; a divinylsulfone compound; a di-thiol compound; a thiolactone compound; an amin oacid compound; a hydroxy-containing amine compound; an amine compound having one hydroxyl or ketone group; a hydroxy-containing carboxylic acid compound; a mercaptane having a hydroxyl, carboxyl or amino group.

For example, a diisocyanate, di-carboxylic acid (preferably a di-carboxylic acid anhydride), di-aziridine, di-epoxy, or di-azlactone compound can be used in the coupling of $E_e$ and $E_{PC}$ when they are different or same and are selected from the group consisting of hydroxyl, primary amino, secondary amino, and thiol groups; a di-amine, di-hydroxyl, di-thiol, hydroxy-containing amine, or hydroxy-containing thiol compound can be used in the coupling of $E_e$ and $E_{PC}$ when they are different or same and are selected from the group consisting of isocyanate, epoxy, aziridine, and carboxylic acid groups; a di-epoxy compound can be used in the coupling of $E_e$ and $E_{PC}$ when they both are carboxylic acid groups; a di-amine compound can be used in the coupling of $E_e$ and $E_{PC}$ when they both are aldehyde groups; a divinylsulfone compound can be used in the coupling of $E_e$ and $E_{PC}$ when they both are thiol groups; a thiolactone compound can be used to covalently attach a thiol group through a linkage to either of $E_e$ and $E_{PC}$ when it is a primary or secondary amino group; a mercaptane having a hydroxyl, carboxyl, amino, or ketone group can be used to covalently attach a hydroxyl, carboxyl, amino, or ketone group through a linkage to $E_{PC}$ when it is an ene or (meth)acryloyl group. A person skilled in the art knows well how to select one or more coupling agents, based on selectivity and/or differential reactivity of a given functional group, to link $E_e$ and $E_{PC}$ to form a photochromic polysiloxane vinylic crosslinker of the invention.

Examples of commercially available di-carboxylic acid anhydrides include without limitation succinic acid anhydride, methylsuccinic anhydride, 2,2-dimethylsuccinic anhydride, 2,3-dimethylsuccinic acid, glutaric acid anhydride, 3,3-dimethylglutaric anhydride, 2,2-dimethylglutaric anhydride, 3-methylglutaric anhydride, 3,3-tetramethylglutaric anhydride, diglycolic anhydride, adipic anhydride, etc.

Any suitable $C_3$-$C_{24}$ di-carboxylic acid compounds can be used in the invention. Examples of preferred di-carboxylic acid compounds include without limitation a linear or branched $C_3$-$C_{24}$ aliphatic dicarboxylic acid, a $C_5$-$C_{24}$ cycloaliphatic or aliphatic-cycloaliphatic dicarboxylic acid, a $C_6$-$C_{24}$ aromatic or araliphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-biphenyldicarboxylic acid, 2,2'-bi phenyldicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable diamines can be used in the invention. An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, N-methyl-1,3-diaminopropane, N-methylethylenediamine, N-ethylethylenediamine, N-isopropyl-1,3-propanediamine, N-propyl-1,3-propanediamine, N-butylethylenediamine, 2,2-dimethyl-1,3-propanediamine, 1,4-butanediamine, 1,5-pentanediamine, hexamethylenediamine, 2-Methyl-1,5-pentanediamine, 1,6-hexamethylenediamine, N,N'-dimethyl-1,6-hexamethylenediamine, 2,2,4 (2,4,4)-trimethyl-1,6-hexanediamine, 1,3-diamino-2-propanol, 1,2-diaminoethane-1,2-diol, 1,1-diaminoethane-1,2-diol, 1,4-diamino-2,3-butanediol, 1,3-cyclopentanediamine, 1,4-diaminocyclohexane, 1,3-Bis(aminomethyl)cyclohexane, 4,4'-diaminodicyclohexylmethane, 4,4'-methylenebis(2-methylcyclohexylamine), isophorone diamine (3-aminomethyl-3,5,5-trimethylcyclohexylamine), m-xylylene diamine, p-xylylene diamine, piperazine, 1-(2-aminoethyl)piperazine, 1,4-bis(3-aminopropyl)piperazine, 2-piperazinoethylamine, 1-Boc-piperazine, 4-(2-aminoethyl)-1-Boc-piperazine, 1-(2-N-Boc-aminoethyl)piperazine, 4-(2-aminoethyl)-1-Boc-piperazine, 4-aminopiperidine, 3-aminopiperidine, 4-aminomethylpiperidine, 2-aminomethylpiperidine, 1-Boc-piperidine-4-carboxaldehyde, 1-Boc-piperidine-4-acetaldehyde, etc.

Any suitable $C_4$-$C_{24}$ diisocyanates can be used in the invention. Examples of preferred diisocyanates include without limitation tetramethylene diisocyanate, pentamethylene diisocyanate, hexamethylene diisocyanate, heptamethylene diisocyanate, 1,6-diisocyanato-2,2,4-trimethylhexane, octamethylene diisocyanate, dodecamethylene diisocyanate, cyclohexane diisocyanate, 1,3-bis-(4,4'-isocyantomethyl)cyclohexane, isophorone diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, etc.

Any suitable di-epoxy compounds can be used in the invention. Examples of preferred di-epoxy compounds are neopentyl glycol diglycidyl ether, 1,3-butadiene diepoxide, 1,4-butanediol diglycidyl ether, 1,2,7,8-diepoxyoctane, 3,4-epoxycyclohexylmethyl-3,4-epoxycyclohexane, 3,4-epoxycyclohexylmethyl-3,4-epoxycyclohexane carboxylate, vinylcyclohexene dioxide, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, bis[4-(glycidyloxy)phenyl]methane, Bisphenol A diglycidyl ether (2,2-Bis[4-(glycidyloxy)phenyl]propane), Bisphenol A propoxylate diglycidyl ether, and combinations thereof.

Any suitable $C_2$-$C_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, 1,4-bis(2-hydroxyethyl)piperazine, bisphenol A, bisphenol F, 4,4'-methylenediphenol, and combination thereof.

Any dimercaptans having 2 to 24 carbon atoms can be used in the invention to prepare a prepolymer of the invention. Examples of dimercaptans include without limitation $C_2$-$C_{12}$ alkyl dimercaptans (e.g., ethyl dimercaptan, propyl dimercaptan, butyl dimercaptan, pentamethylen dimercaptan, hexamethylene dimercaptan, heptamethylene dimercaptan, octamethylen dimercaptan, nonamethylene dimercaptan, decamethylene dimercaptan, 3-ethylcyclohexane-1,2-dithiol, 3-(2-sulfanylethyl)cyclohexane-1-thiol, 3-(1-sulfanylethyl)cyclohexane-1-thiol, 2-methyl-5-(2-sulfanylpropyl)cyclohexane-1-thiol, 2-propylcyclohexane-1,4-dithiol, benzenedithiol, methyl-substituted benzenedithiol, benzenedimethanethiol, 1,1-biphenyl-4,4'-dimethanethiol, biphenyl-4,4-dithiol, ethyl ether dimercaptan, triglycol dimercaptan, tetraglycol dimercaptan, dimercaprol, 2,3-dimercaptopropanol, dithiothreitol, etc.

Any amino acids can be used in the invention. Examples of amino acids include without limitation glycine, proline, alanine, valine, isoleucine, leucine, 2-aminoisobutyric acid, 4-aminobutyric acid, 3-aminoisobutyyric acid, 3-amino-butyric acid, β-alanine, 1-amino-3-cyclopentane carboxylic acid, 3-aminocyclohexanecarboxylic acid, pyrrolidine-3-carboxylic acid, 4-piperidinecarboxylic acid, 3-piperidinecarboxylic acid, 1-piperazineacetic acid, etc.

Examples of compounds having one amino group and one hydroxyl or aldehyde group (or ketone group) include without limitation 1-piperazinepropanol, 2-[2-(1-piperazinyl)ethoxy]ethanol, 4-amino-1-piperazineethanol, 4-piperidinemethanol, 1-Boc-piperidine-4-carboxaldehyde, 4-formylpiperidine, N-Boc-4-piperidineacetaldehyde, etc.

Examples of preferred commercially-available thiolactone include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldi hydro-2(3H)-thiophenone, N-acetyl homocysteine thiolactone, N-propionyl homocysteine thiolactone, N-butyryl homocysteine thiolactone, and N-carboxybutyryl homocysteine thiolactone (or 4-oxo-4-[(tetrahydro-2-oxo-3-thienyl)amino]-butanoic acid).

Any divinylsulfone compounds can be used in the invention. Examples of preferred divinylsulfone compounds include without limitation divinyl sulfone, bis(vinylsulfonyl) $C_1$-$C_6$ alkane, 1,3-bis(vinylsulfonyl)-2-propanol, 1,1-bis(vinylsulfonyl)-1-propanol, 1,5-bis(vinylsulfonyl)-3-pentanol, 1,1-bis(vinylsulfonyl)-3-methoxypropane, 1,5-bis(vinylsulfonyl)-2,4-dimethylbenzene, and 1,4-bis(vinylsulfonyl)-2,3,5,6-tetrafluorobenzene.

Examples of preferred primary and secondary amino-containing chain transfer agents include without limitation 2-mercaptoethylamine, 2-mercaptopropylamine, 3-mercaptopropylamine, 2-mercaptobutylamine, 3-mercaptobutylamine, 4-mercaptobutylamine, 5-mercaptopentylamine, 6-mercaptohexylamine, N-methylaminoethanethiol, N-ethylaminoethanethiol, N-methylaminopropanethiol, N-ethylaminopropanethiol, N-methylaminobutanethiol, N-ethylaminobutanethiol, 2-aminothiolphenol, 3-aminothiolphenol, 4-aminothiolphenol, etc.

Examples of mercaptanes having a carboxylic group include without limitation thioglycolic acid, 2-mercaptopropinic acid, 3-mercaptopropionic acid, 4-mercaptobutyric acid, 2-methyl-3-sulfanylpropanoic acid, 2-mercaptoisobutyric acid, 6-mercaptohexanoic acid, 8-marcaptooctanoic acid, 4-mercaptobenzoic acid, 3-mercaptobenzoic acid, 4-mercaptophenylacetic acid, 2-mercapto-2-phenylacetic acid, etc.

Examples of preferred hydroxyl-containing mercaptanes includes without limitation 2-mercaptoethanol, 3-mercaptonpropanol, 1-mercapto-2-propanol, 2-mercapto-1-propanol, 4-mercapto-1-butanol, 2-mercapto-3-butanol, 3-mercapto-3-methyl-1-butanol, 4-mercapto-4-methyl-1-pentanol, 4-mercapto-4-methyl-2-pentanol, 6-mercapto-1-hexanol, 3-mercapto-1-hexanol, 8-marcapto-1-octanol, 9-mercapto-1-nonanol, 2-mercaptophenol, 3-mercaptophenol, 4-mercaptophenol, 2-mercaptobenzyl alcohol, 4-(6-mercaptohexyloxy)benzyl alcohol, etc.

Examples of preferred mercaptanes having methylcarbonyl group (—$COCH_3$) include without limitation 4-methyl-4-mercaptopentan-2-one, 3-mercapto-2-butanone, etc.

It is desirable to increase the length of covalent linkage between one first reactive functional group $E_e$ and the second functional group $E_{AR}$ of the aryl-containing compound and/or convert one of $E_e$ and $E_{AR}$ to a different reactive functional group that will react with the other group (e.g., in cases where a3 is an integer of from 1 to 2 in formula (1) above) by using one or more coupling agents (i.e., any one of those described above or the likes).

Any aryl-containing compounds can be used to prepare a high RI polysiloxane vinylic crosslinker of the invention, so long as they contain a reactive functional group, such as, a hydroxyl group, a carboxyl group, a primary amino group, a secondary amino group, an isocyanato group, an epoxy group, an aziridine group, a thiol group, a ketone group, or an ethylenically unsaturated group (e.g., ene group, vinyl, vinylsulfonyl group, acryloyl group, and methacryloyl group).

Various reactive aryl-containing compounds can be obtained from commercial sources or prepared by following the procedures known to a person skilled in the art including those described in the patents and literatures.

A high RI polysiloxane vinylic crosslinker of the invention (especially those of formula (1) as defined above) can find particular use in preparing hydrophobic crosslinked polymeric materials for forming high RI inserts and silicone hydrogel polymeric materials for forming silicone hydrogel contact lenses with a high RI and a high Dk (oxygen permeability), which are another aspects of the invention. A person skilled in the art knows how to prepare a hydrophobic crosslinked polymeric material or a silicone hydrogel material from a polymerizable composition according to any known polymerization mechanism.

In another aspect, the invention provides an insert which is made of a hydrophobic crosslinked polymeric material comprising repeating units of a high RI polysiloxane vinylic crosslinker of the invention (as described above).

In a further aspect, the invention provides a silicone hydrogel contact lens comprising a crosslinked polymeric material comprising: units of a polysiloxane vinylic crosslinker of the invention (as described above).

In accordance with the invention, an insert or a silicone hydrogel (SiHy) contact lens of the invention can be produced according to any lens manufacturing processes. A person skilled in the art knows very well how to make inserts or SiHy contact lenses. For example, inserts or SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., an insert formulation or a SiHy lens formulation) typically is dispensed into molds and cured (i.e., polymerized and/or crosslinked) thermally or actinically in molds for making inserts or SiHy contact lenses.

Lens molds for making inserts or contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that an insert-forming or lens-forming cavity is formed between the first molding surface and the second molding surface. The molding surface of a mold half is the cavity-forming surface of the mold and in direct contact with the polymerizable composition.

Methods of manufacturing mold sections for cast-molding a contact lens or insert are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

An insert formulation (i.e., a polymerizable composition) for making inserts of the invention comprises a high RI polysiloxane vinylic crosslinker, other copolymerizable components, a free-radical initiator (thermal initiator or photoinitiator) (any one of those described below), optionally a UV-absorbing vinylic monomer (any one of those described below), optionally a UV/high-energy-violet-light ("HEVL") absorbing vinylic monomer, optionally a photochromic vinylic monomer, etc., as known to a person skilled in the art.

Examples of copolymerizable components used in an insert formulation include without limitation hydrophobic acrylic monomers (any one of those described below), aryl vinylic monomers (any one of those described below), hydrophobic vinylic monomers other than hydrophobic acrylic monomers (any one of those described below), and vinylic crosslinkers (any one of those described below).

A SiHy lens formulation (i.e., a polymerizable composition) for making SiHy contact lenses of the invention comprises a high RI polysiloxane vinylic crosslinker, other copolymerizable components, a free-radical initiator (thermal initiator or photoinitiator) (any one of those described below), optionally a UV-absorbing vinylic monomer (any one of those described below), optionally a UV/HEVL-absorbing vinylic monomer, optionally a photochromic vinylic monomer, etc., as known to a person skilled in the art. Numerous silicone hydrogel lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a lens-forming composition of the invention.

Examples of copolymerizable components used in a SiHy lens formulation include without limitation (1) at least one silicone-containing vinylic monomer (any one of those described below) and/or at least one silicone-containing vinylic crosslinker (any one of those described below); (2) at least one hydrophilic vinylic monomer (any one of those described below); (3) optionally at least one hydrophobic non-silicone vinylic monomer (any one of those described below); and (4) optionally at least one non-silicone vinylic crosslinker (any one of those described below).

Any hydrophobic acrylic monomers can be used in forming an insert of the inventions. Examples of hydrophobic acrylic monomers includes silicone-containing acrylic monomers (any one of those described above in this application), non-silicone hydrophobic acrylic monomers (any one of those described above in this application), fluorine-containing acrylic monomers (any one of those described above in this application), aryl acrylic monomers (any one of those described below), and combinations thereof.

Examples of aryl acrylic monomers include, but are not limited to: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methyl benzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl) ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate; or combinations thereof. More preferred hydrophobic acrylic monomers are 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates. The above listed aryl acrylic monomers can be obtained from commercial sources or alternatively prepared according to methods known in the art.

Examples of hydrophobic monomers other than hydrophobic acrylic monomers include vinyl alkanoates (any one of those described above in this application), vinyloxyalkanes (any one of those described above in this application), and combinations thereof.

Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth) acrylate, 2-ethylhexyl (meth)acrylate, isobornyl (meth)acrylate, (meth)acrylonitrile, etc.), fluorine-containing acrylic monomers (e.g., perfluorohexylethyl-thio-carbonyl-amino-ethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth) acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-isopropyl (meth) acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth) acrylate, and combinations thereof.

Any suitable vinyl crosslinkers can be used in making inserts of the invention. Examples of preferred vinylic crosslinkers include without limitation: polysiloxane vinylic crosslinkers (any one of those described below) and/or non-silicone vinylic crosslinkers.

Examples of non-silicone vinylic crosslinkers include without limitation acrylic crosslinking crosslinkers (any one of those described below), an aryl crosslinker (e.g., divinylbenzene, 2-methyl-1,4-divinylbenzene, bis(4-vinylphenyl) methane, 1,2-bs(4-vinylphenyl)ethane, etc.), tetraethyleneglycol divinyl ether, triethyleneglycol divinyl ether, diethyleneglycol divinyl ether, ethyleneglycol divinyl ether, triallyl isocyanurate, triallyl cyanurate, allylmethacrylate, allylacrylate, N-allyl-methacrylamide, N-allyl-acrylamide, or combinations thereof.

Examples of acrylic crosslinking agents include without limitation ethylene glycol di(meth)acrylate; 1,3-propanediol di(meth)acrylate; 2,3-propanediol di(meth)acrylate; 1,3-butanediol di-(meth)acrylate; 1,4-butanediol di(meth)acrylate; glycerol 1,3-diglycerolate di-(meth)acrylate; 1,5-pentanediol di(meth)acrylate; 1,6-hexanediol di(meth)acrylate; diethylene glycol di(meth)acrylate; triethylene glycol di(meth)acrylate; tetraethylene glycol di(meth)acrylate; ethylenebis[oxy(2-hydroxypropane-1,3-diyl)] di-(meth)acrylate; bis[2-(meth)acryloxyethyl] phosphate; 3,4-bis[(meth)acryloyl]tetrahydrofuan; di(meth)acrylamide; N,N-di(meth)acryloyl-N-methylamine; N,N-di(meth)acryloyl-N-ethylamine; N,N'-methylene bis((meth)acrylamide); N,N'-ethylene bis((meth)acrylamide); N,N'-hexamethylene bis (meth)acrylamide; N,N'-dihydroxyethylene bis(meth) acrylamide; N,N'-propylene bis(meth)acrylamide; N,N'-2-hydroxypropylene bis(meth)acrylamide; N,N'-2,3-dihydroxybutylene bis(meth)acrylamide; 1,3-bis(meth) acrylamidepropane-2-yl dihydrogen phosphate; piperazine diacrylamide; pentaerythritol tri(meth)acrylate; trimethyloylpropane tri(meth)acrylate; tris(2-hydroxyethyl)isocyanurate tri(meth)acrylate; 1,3,5-tri(meth)acryloxylhexahydro-1,3,5-triazine; pentaerythritol tetra(meth)acrylate; di(trimethyloylpropane) tetra(meth)acrylate; bisphenol A di(meth)acrylate; or combinations thereof.

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, 3-methacryloxy propyl pentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, which can be prepared according to the procedures disclosed in U.S. patent Ser. No. 10/081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), allyl alcohol, N-2-hydroxyethyl vinyl carbamate, N-carboxyvinyl-β-alanine (VINAL), N-carboxyvinyl-α-alanine, and combinations thereof.

Examples of alkyl (meth)acrylamides include without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of carboxyl-containing acrylic monomers include without limitation 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

Examples of methylene-containing pyrrolidone monomers include without limitation 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof.

Examples of vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of allyl ether monomers include without limitation ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of phosphorylcholine-containing vinylic monomers include without limitation (meth)acryloyloxyethyl phosphorylcholine, (meth)acryloyloxypropyl phosphorylcholine, 4-((meth)acryloyloxy)butyl-2'-(trimethylammonio) ethylphosphate, 2-[(meth)acryloylamino]ethyl-2'-(trimethylammonio)-ethylphosphate, 3-[(meth)acryloylamino]-propyl-2'-(trimethylammonio)ethylphosphate, 4-[(meth)acryloylamino]butyl-2'-(trimethyl-ammonio) ethylphosphate, 5-((meth)acryloyloxy)pentyl-2'-(trimethylammonio)ethyl phosphate, 6-((meth)acryloyloxy) hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)ethylphosphate, 2-(vinylcarbonylamino)ethyl-2'-(trimethylammonio)ethylphosphate, 2-(allyloxycarbonylamino)-ethyl-2'-(trimethylammonio) ethyl phosphate, 2-(butenoyloxy)ethyl-2'-(trimethylammonio)-ethylphosphate, and combinations thereof.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5-[3''-(4''-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3''-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro (indoline)naphthoxazines, polymerizable spiro(indoline) pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929, 693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-050), 2,4-pentanedione peroxide, dicumyl peroxide, peracetic acid, potassium persulfate, sodium persulfate, ammonium persulfate, 2,2'-azobis(4-methoxy-2,4-di methylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329. Preferably, a SiHy lens formulation for making a SiHy contact lenses comprises at least one photoinitiator which can be initiated by visible lights, such as, benzoylphosphine oxide photoinitiators, Germanium-based Norrish Type I photoinitiators, or combinations thereof.

A polymerizable composition (an insert formulation or a SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless polymerizable composition typically comprises at least one blending vinylic monomer as a reactive solvent for dissolving all other polymerizable components of the solventless SiHy lens formulation.

Examples of preferred blending vinylic monomers include without limitation $C_1$-$C_{10}$ Calkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

In accordance with the invention, a polymerizable composition (insert formulation or SiHy lens formulation) can be introduced (dispensed) into a cavity formed by the male and female mold halves of a mold according to any known methods.

After the polymerizable composition is dispensed into the mold, it is polymerized to produce a SiHy contact lens. Crosslinking may be initiated thermally or actinically, as known to a person skilled in the art.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Opening of the mold so that the molded insert or SiHy contact lens can be removed from the mold may take place in a manner known per se.

The molded insert or SiHy contact lenses can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

After extraction, silicone hydrogel contact lens can be hydrated in water or an aqueous solution to replace the liquid extraction medium, according to any method known to a person skilled in the art.

The hydrated silicone hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A polysiloxane vinylic crosslinker, comprising:
   (1) a polysiloxane segment comprising dimethylsiloxane units and aryl-containing siloxane unit having one methyl substituent and one organic substituent having up to 45 carbon atoms and at least one aryl moiety which is linked to Si atom through a linker having at least 2 (preferably at least 3) carbon atoms; and
   (2) ethylenically-unsaturated groups.
2. The polysiloxane vinylic crosslinker of embodiment 1, wherein the polysiloxane vinylic crosslinker has a refractive index of at least 1.48 and a $T_g$ of about 0° C. or lower.
3. The polysiloxane vinylic crosslinker of embodiment 2, wherein the polysiloxane vinylic crosslinker has a refractive index of at least 1.51.
4. The polysiloxane vinylic crosslinker of embodiment 2, wherein the polysiloxane vinylic crosslinker has a refractive index of at least 1.54.
5. The polysiloxane vinylic crosslinker of embodiment 2, wherein the polysiloxane vinylic crosslinker has a refractive index of at least 1.57.
6. The polysiloxane vinylic crosslinker of any one of embodiments 1 to 5, wherein the polysiloxane vinylic crosslinker has a $T_g$ of about −5.0° C. or lower.
7. The polysiloxane vinylic crosslinker of any one of embodiments 1 to 5, wherein the polysiloxane vinylic crosslinker has a $T_g$ of about −10.0° C. or lower.
8. The polysiloxane vinylic crosslinker of any one of embodiments 1 to 5, wherein the polysiloxane vinylic crosslinker has a $T_g$ of about −20.0° C. or lower.
9. The polysiloxane vinylic crosslinker of any one of embodiments 1 to 5, wherein the polysiloxane segment comprises at least 30% by mole of the aryl-containing siloxane units.
10. The polysiloxane vinylic crosslinker of any one of embodiments 1 to 5, wherein the polysiloxane segment comprises at least 40% by mole of the aryl-containing siloxane units.
11. The polysiloxane vinylic crosslinker of any one of embodiments 1 to 5, wherein the polysiloxane segment comprises at least 50% by mole of the aryl-containing siloxane units.
12. The polysiloxane vinylic crosslinker of any one of embodiments 1 to 5, wherein the polysiloxane segment comprises at least 60% by mole of the aryl-containing siloxane units.
13. The polysiloxane vinylic crosslinker of any one of embodiments 1 to 5, wherein the polysiloxane segment comprises at least 70% by mole of the aryl-containing siloxane units.
14. The polysiloxane vinylic crosslinker of any one of embodiments 1 to 13, wherein the polysiloxane vinylic crosslinker has a number average molecular weight of at least 1000 Daltons.
15. The polysiloxane vinylic crosslinker of any one of embodiments 1 to 14, wherein the polysiloxane vinylic crosslinker has a number average molecular weight of from about 1500 Daltons to about 100000 Daltons.
16. The polysiloxane vinylic crosslinker of any one of embodiments 1 to 14, wherein the polysiloxane vinylic crosslinker has a number average molecular weight of from 2000 Daltons to 80000 Daltons.
17. The polysiloxane vinylic crosslinker of any one of embodiments 1 to 14, wherein the polysiloxane vinylic crosslinker has a number average molecular weight of from 2500 to 60000 Daltons.
18. The polysiloxane vinylic crosslinker of any one of embodiments 1 to 17, wherein the polysiloxane vinylic crosslinker is defined by formula (1)

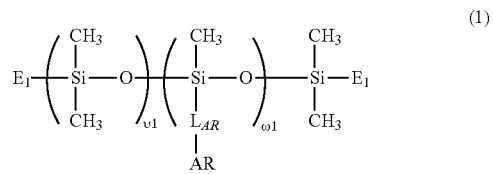

in which:
$v1$ is an integer of from 1 to 400;
$\omega1$ is an integer of from 1 to 800;

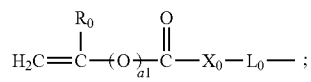

$E_1$ is a monovalent radical of
$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

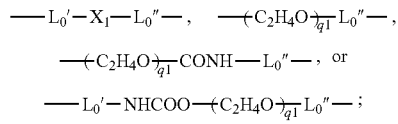

$L_0'$ is a $C_2$-$C_8$ alkylene divalent radical;
$L_0''$ is $C_3$-$C_8$ alkylene divalent radical;
$X_1$ is —O—, —$NR_{N1}$—, —NHCOO—, —OCONH—, —$CONR_{N1}$—, or —$NR_{N1}$CO—;
q1 is an integer of 1 to 10;
AR is an aryl radical;
$L_{AR}$ is a divalent radical of

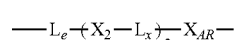

$L_e$ is a divalent radical of

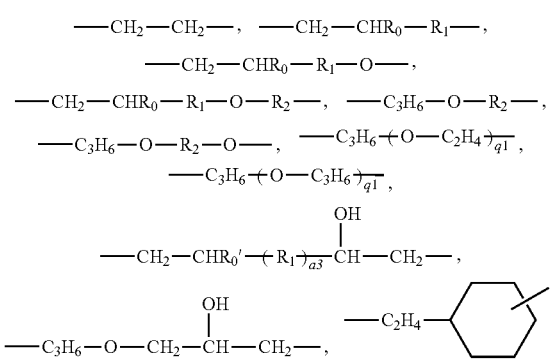

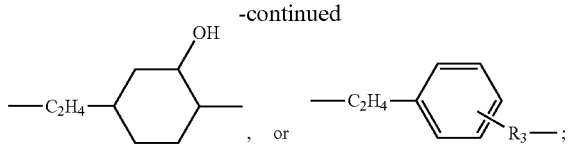

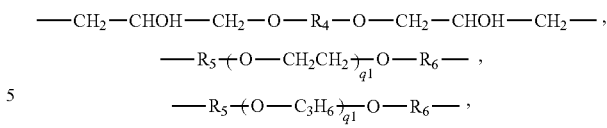

a2 is zero or 1 or 2;

a3 is zero or 1;

$R_1$ is a linear or branched $C_1$-$C_{10}$ alkylene divalent radical which is optionally substituted with $C_1$-$C_4$ alkoxy group, hydroxyl group, carboxyl group, amino group, oxo group, or combinations thereof;

$R_2$ is a linear or branched $C_1$-$C_{10}$ alkylene divalent radical;

$R_3$ is a direct bond or a linear or branched $C_1$-$C_4$ alkylene divalent radical;

$X_{AR}$ and each $X_2$ independently of others are a covalent bond, a linear or branched $C_1$-$C_4$ alkylene divalent radical or a covalent linkage of

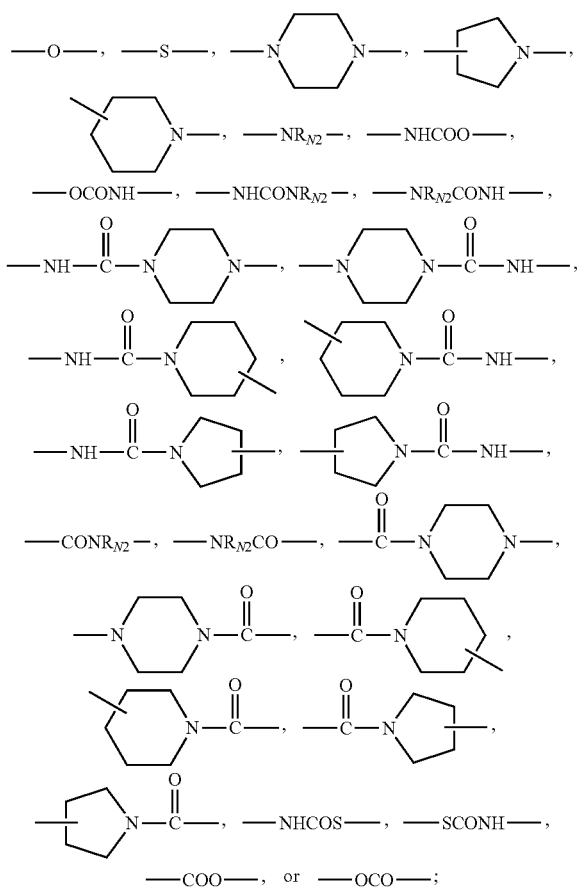

$R_{N2}$ is hydrogen, a linear or branched $C_1$-$C_6$ alkyl, cyclohexyl, cyclopentyl, a substituted or unsubstituted phenyl, or a substituted- or unsubstituted-phenyl-$C_1$-$C_6$ alkyl;

each $L_x$ independently is a linear or branched $C_1$-$C_{10}$ alkylene divalent radical which optionally has one or more hydroxyl or $C_1$-$C_4$-alkoxy groups or $C_1$-$C_4$-acylamino groups, or a divalent radical which optionally has one or more hydroxyl or $C_1$-$C_4$-alkoxy groups and is obtained by removal of two hydrogen atoms from two different atoms of a hydrocarbon that has up to 20 carbon atoms and comprises at least one divalent radical selected from the group consisting of cycloalkylene radical, substituted cycloalkylene radical, phenylene radical, substituted phenylene radical, cycloheteroalkylene radical, and substituted cycloheteroalkylene radical; and each $R_4$, $R_5$ and $R_6$ independent of one another are a linear or branched $C_1$-$C_{10}$ alkylene divalent radical which has zero or one hydroxyl group.

19. The polysiloxane vinylic crosslinker of embodiment 18, wherein in formula (1) ν1 is an integer of from 3 to 350.

20. The polysiloxane vinylic crosslinker of embodiment 18, wherein in formula (1) ν1 is an integer of from 5 to 300.

21. The polysiloxane vinylic crosslinker of embodiment 18, wherein in formula (1) ν1 is an integer of from 10 to 250.

22. The polysiloxane vinylic crosslinker of any one of embodiments 18 to 22, wherein in formula (1) ω1 is an integer of from 5 to 700.

23. The polysiloxane vinylic crosslinker of any one of embodiments 18 to 22, wherein in formula (1) ω1 is an integer of from 10 to 600.

24. The polysiloxane vinylic crosslinker of any one of embodiments 18 to 22, wherein in formula (1) ω1 is an integer of from 15 to 500.

25. The polysiloxane vinylic crosslinker of any one of embodiments 18 to 24, wherein in formula (1) a1 is zero.

26. The polysiloxane vinylic crosslinker of embodiment 25, wherein formula (1) $X_0$ is O.

27. The polysiloxane vinylic crosslinker of embodiment 25, wherein formula (1) $X_0$ is $NR_{N1}$.

28. The polysiloxane vinylic crosslinker of any one of embodiments 18 to 27, wherein in formula (1) ω1/(ν1+ω1) is from about 0.30 to about 0.95.

29. The polysiloxane vinylic crosslinker of any one of embodiments 18 to 27, wherein in formula (1) ω1/(ν1+ω1) is from about 0.40 to about 0.90.

30. The polysiloxane vinylic crosslinker of any one of embodiments 18 to 27, wherein in formula (1) ω1/(ν1+ω1) is from about 0.50 to about 0.90.

31. The polysiloxane vinylic crosslinker of any one of embodiments 18 to 27, wherein in formula (1) ω1/(ν1+ω1) is from about 0.60 to about 0.85.

32. The polysiloxane vinylic crosslinker of any one of embodiments 18 to 31, wherein in formula (1) AR is a phenyl group, a substituted phenyl group, a naphthyl group, a substituted naphthyl group, an anthracenyl group, a substituted anthracenyl group, a phenanthryl group, or a substituted phenanthryl group.

33. The polysiloxane vinylic crosslinker of any one of embodiments 18 to 31, wherein in formula (1) AR is a monovalent radical of

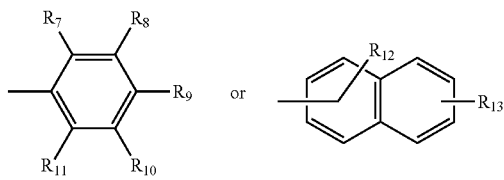

in which $R_7$, $R_8$, $R_9$, $R_{10}$, $R_{11}$, $R_{12}$, and $R_{13}$ independent of one another are H, Cl, Br, F, $CF_3$, $CCl_3$, $C_1$-$C_5$ alkyl, $C_1$-$C_5$ alkoxy, $C_2$-$C_5$ acyloxy, OH, phenyl, phenoxy, benzyloxy, phenylcarbonyl, phenoxycarbonyl, phenylcarboxy (phenylcarbonyloxy), or naphthyl.

34. An insert which is made of a hydrophobic crosslinked polymeric material comprising repeating units of a polysiloxane vinylic crosslinker of any one of embodiments 1 to 33.
35. An embedded silicone hydrogel contact lens comprising a silicone hydrogel bulk material and an insert of embodiment 34, wherein the insert is fully or partially embedded within the silicone hydrogel bulk material.
36. A silicone hydrogel contact lens, comprising a silicone hydrogel bulk material which comprises repeating units of a polysiloxane vinylic crosslinker of any one of embodiments 1 to 33.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Refractive Index

The refractive index (RI) of inserts is determined by Abbe transmission laboratory refractometer Reichert Abbe Mark III at 25° C. The inserts are fully equilibrated in PBS saline solution before measurement.

The refractive index (RI) of polysiloxane vinylic crosslinker is determined by Rudolph Research Analytical Refractometer (Model J357) at 20° C. The RI of distilled water (RI of 1.33299 at 20.0° C.) is used as reference and is performed before and after the measurement of polysiloxane vinylic crosslinker.

Glass Transition Temperature

Glass transition temperature (Tg) of the insert is defined as the peak of tan δ from the dynamic temperature ramp test by using TA RSA-G2 DMA (Dynamic Mechanical Analyzer).

According to this application, the glass transition temperature (Tg) of a polysiloxane vinylic crosslinker is the midpoint temperature in a differential-scanning-calorimetry diagram obtained by using Differential Scanning calorimetry (DSC). FIG. 1 shows a DSC diagram obtained for a polysiloxane vinylic crosslinker of the invention and is characterized by its onset, midpoint, inflection and endset temperature.

Delamination

Embedded silicone hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (OPTIMEC England, model JCF). After the contact lens is settled under the influence of gravity, the front view of the contact lens is inspected carefully for any sign of circular pattern. Delamination displays as circular patterns in Optimec image.

OCT (Thorlabs Spectral Domain Optical Coherence Tomography, model Telesto-II) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: BzA represents benzylacrylate; BzMA represent benzylmathacrylate; DVBz represents divinyl Benzene; p-STTMS represents styryltrimethoxysilane; PETA represents pentaerythritol tetraacrylate; TrisMA represents 3-[Tris(trimethylsiloxy)silyl]propyl methacrylate; D6 represents monobutyl-terminated monomethacryloxypropyl-terminated polydimethylsiloxane (M.W. 600 to 800 g/mol from Gelest); DMA represents N,N-dimethyl acrylamide; MMA represents methyl methacrylate; TEGDMA represent triethyleneglycol dimethacrylate; Vazo-67 represents 2,2'-Azobis (2-methylbutyronitrile); Ominirad-1173 represents a photoinitiator made of 2-hydroxy-2-methyl-1-phenylpropanone; Nobloc is 2-[3-(2H-Benzotriazol-2-yl)-4-hydroxyphenyl]ethyl methacrylate from Aldrich; RB247 is Reactive Blue 247 (2-Propenoic acid, 2-methyl-, 1,1'-[(9,10-dihydro-9,10-dioxo-1,4-anthracenediyl)bis(imino-2,1-ethanediyl)]ester); TAA represents tert-amyl alcohol; PrOH represents 1-propanol; IPA represents isopropanol; PPG represents poly(propylene glycol); EGBE represents ethylene glycol butyl ether; PBS represents a phosphate-buffered saline which has a pH of 7.2±0.2 at 25° C. and contains about 0.044 wt. % $NaH_2PO_4·H_2O$, about 0.388 wt. % $Na_2HPO_4·2H_2O$, and about 0.79 wt. % NaCl and; wt. % represents weight percent; "H4" macromer represents a di-methacryloyloxypropyl-terminated polysiloxane (Mn~11.3K-12.3K g/mol, OH content~1.82-2.01 meq/g) of formula (A) shown below; "HA" macromer represents a di-methacryloyloxypropyl-terminated polysiloxane (Mn~6.8K g/mol, OH content~1.2 meq/g) of formula (A) shown below.

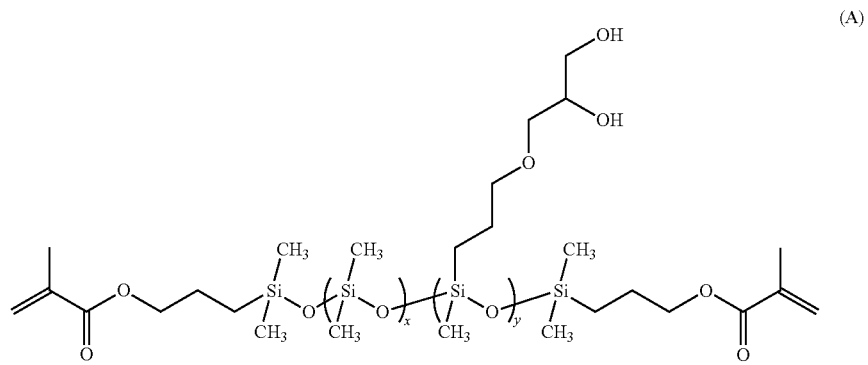

(A)

Example 2

A hydrosiloxane-containing polysiloxane (precursor for making a polysiloxane vinylic crosslinker of the invention is prepared according to the procedures shown in Scheme 1.

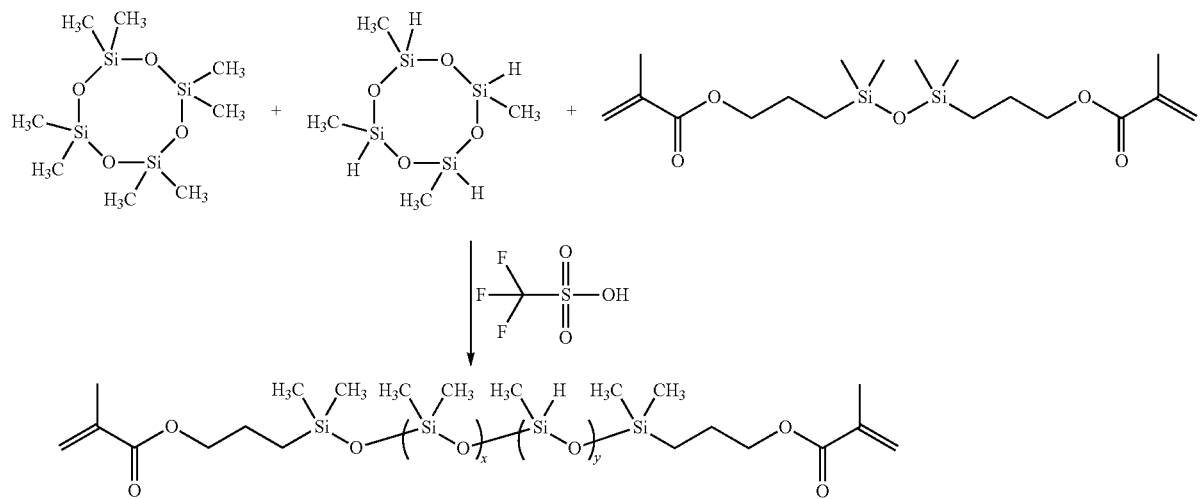

Scheme 1

Synthesis of Hydrosiloxane-Containing Polysiloxane (Mn~5 KD)

602.05 g of Octamethylcyclotetrasiloxane (D4), 510.32 g of 1,3,5,7-tetramethyl-cyclotetrasiloxane (D4H) and 92.81 g of 1,3-bis(3-methacryloxypropyl)tetramethyldisiloxane are weighted and premixed in a flask and then charged to a 2-L jacketed reactor equipped with a mechanical motor, thermocouple and nitrogen flow adapter. Then 2.4 g of triflic acid is added via pipet to the stirred reaction mixture. The reaction is allowed to stir at 25° C. for about 16 hours. After the reaction is completed, the solution is diluted with 1000 mL of toluene and then neutralized by a solid base, followed with one hour of stirring. The final mixture is filtered with the use of 0.45 micron Glass Microfiber Filter. At this point, BHT and MEHQ inhibitors are added (250 ppm each). Polymer solution is concentrated on rotavap and then under low vacuum to remove the residual solvent. The resultant precursor is not purified and determined to have a number average molecular weight of about 5,000 g/mol., an averaged x of about 31 (by $^1$H NMR), and an averaged y of about 32 (by $^1$H NMR).

Synthesis of Hydrosiloxane-Containing Polysiloxane (Mn~3 KD)

100.19 g of Octamethylcyclotetrasiloxane (D4), 247.39 g of 1,3,5,7-tetramethylcyclotetrasiloxane (D4H) and 51.32 g of 1,3-bis(3-methacryloxypropyl)-tetramethyldisiloxane are weighted and premixed in a flask and then charged to a 1-L jacketed reactor equipped with a mechanical motor, thermocouple and nitrogen flow adapter. Then 0.8 g of triflic acid is added via pipet to the stirred reaction mixture. The reaction is allowed to stir at 25° C. for about 16 hours. After the reaction is completed, the solution is diluted with 200 mL of toluene and then neutralized by a solid base, followed with one hour of stirring. The final mixture is filtered with the use of 0.45 micron Glass Microfiber Filter. At this point, BHT and MEHQ inhibitors are added (250 ppm each). Polymer solution is concentrated on rotavap and then under low vacuum to remove the residual solvent. The resultant precursor is not purified and determined to have a number average molecular weight of about 3,000 g/mol., an averaged x of about 9.4 (by $^1$H NMR), and an averaged y of about 28.1 (by $^1$H NMR).

Example 3

Synthesis of the High Refractive Index Polysiloxane Vinylic Crosslinker:

A 500 mL jacketed reactor equipped with a mechanical stirrer, thermocouple, nitrogen feed, septum and condenser is warmed up to 80° C. and purged with nitrogen for 30 min at the rate of 100 mL/min. Allyl phenyl ether (ca. 158.62 g, i.e., in a molar ratio of 2:1 over hydrosiloxane unit), toluene (40 mL), and about 88.1 µL (ca. 25 ppm related to the precursor) of Karstedt's catalyst solution are charged to the reactor. Nitrogen flow was reduced to 50 mL/min. The hydrosiloxane-containing polysiloxane (Mn~3 KD) prepared in Example 2 (ca. 60.00 g), MEHQ inhibitor (0.0085 g), and toluene (60-80 mL) are added into the beaker, stirred for 10 min until MEHQ dissolved and charged into two, 100 mL Hamilton Gas Tight syringes equipped with plastic cannula. Each syringe with around 70 mL of polymer solution is secured to a Harvard PHD Infusion syringe pump and feed lines are inserted into the reactor via rubber septum. Solution of the hydrosiloxane-containing polysiloxane in toluene is added via syringe pump over the course of 5 hours (at rate of 0.2333 mL/min). The temperature of the reactor is maintained at 80±2° C. throughout the course of the reaction. After addition of polymer, the reaction mixture is additionally stirred for 1 h. After this time, IR scan of crude reaction mixture confirms complete consumption of Si—H bonds. The reaction mixture is then cooled down to room temperature and crude polymer is purified by thin-film distillation (temperature of hot finger is 100° C. achieved by refluxing water, reduced pressure is maintained at 1.3-1.9 mbar for the entire process). Collected polymer fraction has a $T_g$ of –48° C. and a refractive index of 1.51553 (at 20° C.). $^1$H NMR spectrum of final product shows no presence of allyl phenyl ether.

The hydrosiloxane-containing polysiloxane (Mn~5 KD) prepared in Example 2 is also used to prepare a polysiloxane vinylic crosslinker according to the procedure described above. The resultant polysiloxane vinylic crosslinker has a refractive index of 1.49617 (at 20° C.).

Example 4

This example illustrates synthesis of two high refractive index polysiloxane vinylic crosslinkers (macromers).

A 500 mL jacketed reactor equipped with a mechanical stirrer, thermocouple, nitrogen feed, septum and condenser is charged with phenothiazine (0.096 g), allyl benzyl ether (ca. 117.9 g), which is in a molar ratio of about 1.6:1 over hydrosiloxane unit, and toluene (59 mL). Reaction mixture is purged with nitrogen, at room temperature for 30-40 min

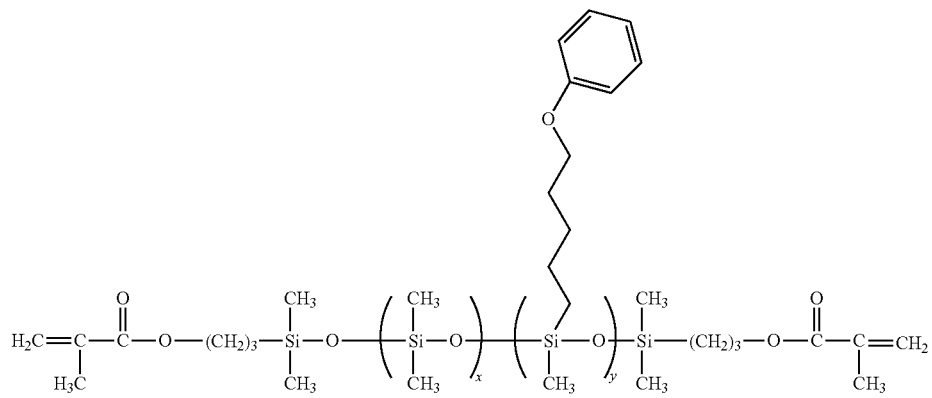

at the rate of 100 mL/min. Then, about 111.2 μL (ca. 40 ppm related to the precursor) of Karstedt's catalyst solution is the final macromer also becomes lower and more manageable. Results are reported in Table 1.

TABLE 1

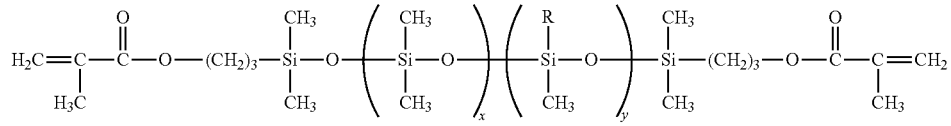

| | Macromer I | Macromer II |
|---|---|---|
| Structure | $x \approx 9; y \approx 28$ | $x \approx 9; y \approx 28$ |
| RI (20° C.) | 1.51151 | 1.50582 |
| $T_g$ | −51° C. | −72° C. |
| GPC  $M_n$ | 7593 | 7055 |
|  $M_w$ | 14537 | 11903 |
|  PDI | 1.9 | 1.7 |
| Viscosity  Precursor | 25 cP | 25 cP |
|  Macromer | 3412 cP | 929 cP |
| C=C loss (% by NMR) | 35-40% | Very negligible | charged to the reactor and the reactor is warmed up to 95° C., nitrogen flow is reduced to 50 mL/min.

The hydrosiloxane-containing polysiloxane (Mn~3 KD; x≈9; y≈28) prepared in Example 2 (ca. 48.0 g), and toluene (24 mL) are added into the beaker, stirred for 10 min and charged into 100 mL Hamilton Gas Tight syringes equipped with plastic cannula. Syringe with around 72 mL of polymer solution is secured to a Harvard PHD Infusion syringe pump and feed lines are inserted into the reactor via rubber septum. Solution of the hydrosiloxane-containing polysiloxane in toluene is added via syringe pump over the course of 2 hours (at rate of 0.6 mL/min). The temperature of the reactor is maintained at 95±2° C. throughout the course of the reaction. After addition of polymer, the reaction mixture is additionally stirred for 1 h. After this time, IR scan of crude reaction mixture confirms complete consumption of Si—H bonds. The reaction mixture is then cooled down to room temperature and crude polymer is purified by extraction in cyclohexane/acetonitrile system. Polymer dissolves in cyclohexane (bottom layer) and excess of allyl benzyl ether partitions to acetonitrile layer. Typically, five extractions are conducted to remove allyl benzyl ether completely. After the extraction 83.7 g of clear, viscous, nearly odorless amber fluid as collected.

During optimization of hydrosilylation reaction, it is noted that that when allyl phenyl ether is used, there is significant loss of terminal methacrylate double bonds, reaching up to 40%. Changing of the reaction conditions, e.g., temperature, stoichiometry, order of addition, time of addition etc. do not improve the outcome of the reaction. Even increasing inhibitor (phenothiazine) level up to 6000 ppm do not reduce double bond loss, indicating that methacrylate group is competing with allyl component in hydrosilylation reaction with silanes (Si—H) to form C—Si bond. As an outcome of this competition, significant increase in viscosity of the final macromer is observed (Table 1). In extreme cases final polymer can be so thick that it is impossible to blend it into the formulation. However, very different outcome is observed when allyl phenyl ether is substituted by allyl benzyl ether. Very negligible methacrylate double bond loss is observed by NMR. Viscosity of

Example 5

Insert Formulations

Polymerizable compositions (insert formulations) for making inserts are prepared at room temperature in air by blending all the components (materials) in their desired amounts (weight parts units) to have the composition shown in Table 2.

TABLE 2

| | Insert Formulation # (weight part units) | | |
|---|---|---|---|
| | 1 (Insert HRI-2) | 2 (Insert HRI-19) | 3 (Insert HRI-31) |
| TrisMA | 22.2 | 0 | 0 |
| BzMA | 48.3 | 36.2 | 0 |
| BzA | 0 | 0 | 14.9 |
| D6 | 19.3 | 0 | 0 |
| P-STTMS | 0 | 45.2 | 14.9 |
| High RI Si-macromer (Example 3) | 0 | 9 | 49.7 |
| PETA | 9.7 | 9 | 0 |
| DVBz | 0 | 0 | 9.9 |
| RB247 | 0.01 | 0.01 | 0.01 |
| Vazo-67 | 0.5 | 0.5 | 0.5 |

Cast-Molded Inserts

An insert formulation (polymerizable composition) is purged with nitrogen at room temperature for 30 to 35 minutes. The $N_2$-purged polymerizable composition (30-40 mg) is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert formulations (polymerizable compositions) in the molds are thermally cured in the oven under the following conditions: holding at 25° C. and a $N_2$ flow rate of 80 scfh (standard cubic foot per hour) for about 30 minutes; ramp from 25° C. to 55° C. at a ramp rate of about 7°

C./minute; holding at 55° C. and a N$_2$ flow rate of 40 scfh for about 30 minutes; ramp from 55° C. to 80° C. at a ramp rate of about 7° C./minute; holding at 80° C. and a N$_2$ flow rate of 40 scfh for about 30 minutes; ramp from 80° C. to 100° C. at a ramp rate of about 7° C./minute; and holding at 100° C. and a N$_2$ flow rate of 40 scfh for about 30 minutes. The molds are opened and the molded inserts are removed from the molds.

The inserts may or may not be extracted. Following procedure is used for extraction of inserts (if needed). First, the inserts are extracted with PrOH for about 3 hours, rinsed twice with deionized water for about 10 minutes, and dried in vacuum oven at 50 C and 26 mm Hg for 1 hour. Inserts obtained from insert formulation #1 has a RI of about 1.50; inserts obtained from insert formulation #2 has a RI of about 1.51; inserts obtained from insert formulation #3 has a RI of about 1.55.

SiHy Lens Formulations

Two SiHy lens formulations are prepared at room temperature in air by blending all the components (materials) in their desired amounts (weight parts units) to have the composition shown in Table 3.

TABLE 3

| Chemical components | SiHy lens Formulation # (weight part units) | |
|---|---|---|
| | 1 (Carrier GT-10) | 2 (Carrier GU-1) |
| H4 Macromer | 28.45 | 0 |
| HA Macromer | 0 | 32 |
| TrisMA | 14.66 | 21 |
| DMA | 20.69 | 24 |
| MMA | 12.93 | 0 |
| TEGDMA | 0.86 | 0 |
| EGBE | 21.98 | 22 |
| VAZO 67 | 0.43 | 0.5 |
| Omnirad 1173 | 0 | 1 |

Preparation of SiHy Contact Lenses

Thermally or actinically cast-molded SiHy contact lenses are prepared as follows.

Molding Assembly. An amount (about 50-60 mg) of a SiHy lens formulation prepared above is dosed in a polypropylene female mold half, a polypropylene male mold half is then placed on top the female mold half, and the mold is closed securely to form a molding assembly.

Thermal Curing. The molding assemblies (i.e., closed mold with a SiHy lens formulation therein) are thermally cured in the oven under the following conditions: holding at 25° C. and a N$_2$ flow rate of 80 scfh for about 30 minutes; ramp from 25° C. to 55° C. at a ramp rate of about 7° C./minute; holding at 55° C. and a N$_2$ flow rate of 40 scfh for about 30 minutes; ramp from 55° C. to 80° C. at a ramp rate of about 7° C./minute; holding at 80° C. and a N$_2$ flow rate of 40 scfh for about 30 minutes; ramp from 80° C. to 100° C. at a ramp rate of about 7° C./minute; and holding at 100° C. and a N$_2$ flow rate of 40 scfh for about 30 minutes.

Actinic Curing. The molding assemblies (i.e., closed mold with SiHy lens formulation #5 therein) are fully cured using a double-sided UV curing oven having ~1 mW/cm$^2$ intensity (Wicked Engineering, UV LED Module 9W 365 nm/405 nm) for 10 minutes.

Demoldinq and Delensing. Lens molds each with a molded unprocessed SiHy contact lens therein are mechanically opened. The molded unprocessed SiHy contact lens adhere to the male mold halves or female mold halves. Molded unprocessed SiHy contact lenses adhered to male mold halves are delensed using ultrasonic unit; molded unprocessed SiHy contact lenses adhered to female mold halves are manually delensed from lens-adhered female mold halves.

Post-Delensing Process. The delensed unprocessed SiHy contact lenses can be extracted with a mixture of 50:50 of propylene glycol:water. Preferably, the delensed unprocessed SiHy contact lenses are subjected to the following extraction/hyradtion, coating, autoclave processes as follows. The unprocessed SiHy contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant SiHy contact lenses each have a hydrogel coating thereon.

The lens properties of the resultant SiHy contact lenses are determined according to the procedures described in Example 1 and reported in Table 4.

TABLE 4

| | SiHy Lens Formulation # (weight part units) | |
|---|---|---|
| | 1 | 2 |
| Dk (Barrers) | 114 | 167 |
| Modulus (MPa) | 0.69 | 0.65 |
| WC (% by weight) | 29.5 | 25.0N/A |

Preparation of Fully Embedded SiHy Contact Lenses

Thermally or actinically cast-molded embedded SiHy contact lenses are prepared as follows.

Molding Assembly. An insert prepared above is placed in the central region of the molding surface of a female mold half (made of polypropylene) which preferably has three or more spikes distributed in a circle having a diameter sufficient to accommodate the insert for fixing the position of the insert on the molding surface, an amount (about 50-60 mg) of a SiHy lens formulation prepared above is dosed in the female mold half to immerse the insert, a polypropylene male mold half is then placed on top the female mold half, and the mold is closed securely to form a molding assembly.

Thermal Curing. The molding assemblies (i.e., closed molds each with an insert immersed in a SiHy lens formulation therein) are thermally cured according to procedures described above for making SiHy contact lenses.

Actinic Curing. The molding assemblies (i.e., closed molds each with an insert immersed in SiHy lens formulation #5 therein) are fully cured actinically according to the procedures described for making SiHy contact lenses.

Demoldinq and Delensing. Demolding and delensing are carried out as described above for making SiHy contact Lenses.

Post-Delensing Process. The delensed unprocessed embedded SiHy contact lenses are subjected to the extraction/hydration, coating, autoclave processes as described above for making SiHy contact lenses. The resultant embedded SiHy contact lenses each have a hydrogel coating thereon.

The resultant embedded SiHy contact lenses are examined for possible delamination under microscopy (i.e., using OCT according to the procedures described in Example 1). No delamination is observed. The embedded SiHy contact lenses show having well-defined lens geometry without distortion after delensing, extraction, coating, hydration and autoclave. It is believed that both the insert and the bulk SiHy material have minimum swell ratio upon hydration, resulting in minimum internal stress and thus good geometry stability over time. The characterization of the embedded SiHy contact lenses are reported in Table 5.

TABLE 5

| Embedded SiHy Contact Lens | Formulation # Insert | Formulation # SiHy Lens | Delamination | RI (Insert/SiHy)[1] | ΔRI[2] |
|---|---|---|---|---|---|
| #1 | 1 | 1 | No | 1.50/1.43 | 0.07 |
| #2 | 3 | 1 | No | 1.55/1.43 | 0.12 |
| #3 | 3 | 2 | No | 1.55/1.43 | 0.12 |

[1]determined directly with the embedded SiHy contact lenses.
[2]ΔRI = $RI_{insert} - RI_{bulk}$ By having a difference of at least about 0.07, an embedded SiHy contact lens of the invention can find particular use in making diffractive multifocal contact lenses.

Preparation of Partially Embedded SiHy contact lenses

Thermally or actinically cast-molded embedded SiHy contact lenses are prepared as follows.

An insert-forming composition (Insert formulation #2) prepared above is purged with nitrogen at room temperature for 30 to 35 minutes. A specific volume (e.g., 30-40 mg) of the $N_2$-purged insert-forming composition is disposed in the center of the molding surface of a female lens mold half that is made of polypropylene and the molding surface defines the anterior surface of a contact lens to be molded. The female lens mold half with the insert-forming composition therein is closed with a male insert mold half which is made of polypropylene and designed to have an overflow groove into which any excess insert-forming composition is pressed during closing for forming a first molding assembly. The male insert mold half has a molding surface defining the posterior surface of an insert to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions in the first molding assemblies are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The first molding assemblies are opened and the molded inserts are adhered onto the central area of the molding surface of the female lens mold halves.

A lens-forming composition (SiHy lens formulation #1) prepared above is purged with nitrogen at room temperature for 30 to 35 minutes. A specific volume (e.g., 50-60 mg) of the $N_2$-purged lens-forming composition is disposed onto the molded insert adhered onto the central portion of the molding surface of the female lens mold half. The female lens mold half with the insert adhered thereonto and with the lens-forming composition is closed with a male lens mold half which is made of polypropylene and designed to have an overflow groove into which any excess lens-forming composition is pressed during closing for forming a second molding assembly. The male lens mold half has a molding surface defining the posterior surface of a contact lens to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The closed 2$^{nd}$ molding assemblies each with a molded insert immersed in a lens-forming composition in the lens molding cavities are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The 2$^{nd}$ molding assemblies each with a molded unprocessed embedded silicone hydrogel contact lens therein are mechanically opened. The molded unprocessed embedded silicone hydrogel contact lens adhere to the male mold halves or female mold halves. Molded unprocessed embedded silicone hydrogel contact lenses adhered to male mold halves are delensed using ultrasonic unit; molded unprocessed embedded silicone hydrogel contact lenses adhered to female mold halves are delensed are manually from lens-adhered female mold halves.

The delensed unprocessed embedded SiHy contact lenses are subjected to the extraction/hydration, coating, autoclave processes as described above for making SiHy contact lenses. The resultant embedded SiHy contact lenses each have a hydrogel coating thereon.

The resultant partially embedded SiHy contact lenses are examined for possible delamination using OCT according to the procedures described in Example 1. No delamination is observed. The embedded SiHy contact lenses show having well-defined lens geometry without distortion after delensing, extraction, coating, hydration and autoclave. It is believed that both the insert and the bulk SiHy material have minimum swell ratio upon hydration, resulting in minimum internal stress and thus good geometry stability over time. The characterization of the embedded SiHy contact lenses are reported in Table 6.

TABLE 6

| Embedded SiHy Contact Lens | Formulation # Insert | Formulation # SiHy Lens | Delamination | RI (Insert/SiHy)[1] | ΔRI[2] |
|---|---|---|---|---|---|
| #4 | 2 | 1 | No | 1.51/1.43 | 0.08 |

[1]determined directly with the embedded SiHy contact lenses.
[2]ΔRI = $RI_{insert} - RI_{bulk}$ By having a difference of at least about 0.08, a partially embedded SiHy contact lens of the invention can find particular use in making diffractive multifocal contact lenses.

All the publications, patents, and patent application publications, which have been cited herein above, are hereby incorporated by reference in their entireties.

What is claimed is:
1. A polysiloxane vinylic crosslinker, comprising:
(1) a polysiloxane segment comprising dimethylsiloxane units and aryl-containing siloxane unit having one methyl substituent and one organic substituent having up to 45 carbon atoms and at least one aryl moiety which is linked to Si atom through a linker having at least 2 carbon atoms; and
(2) ethylenically-unsaturated groups.

2. The polysiloxane vinylic crosslinker of claim 1, wherein the polysiloxane vinylic crosslinker has a refractive index of at least 1.48 and a $T_g$ of about 0° C. or lower.

3. The polysiloxane vinylic crosslinker of claim 2, wherein the polysiloxane segment comprises at least 30% by mole of the aryl-containing siloxane units.

4. The polysiloxane vinylic crosslinker of claim 3, wherein the polysiloxane vinylic crosslinker has a number average molecular weight of at least 1000 Daltons.

5. The polysiloxane vinylic crosslinker of claim 1, wherein the polysiloxane segment comprises at least 30% by mole of the aryl-containing siloxane units.

6. The polysiloxane vinylic crosslinker of claim 5, wherein the polysiloxane vinylic crosslinker has a number average molecular weight of at least 1000 Daltons.

7. The polysiloxane vinylic crosslinker of claim 2, wherein the polysiloxane vinylic crosslinker is defined by formula (1)

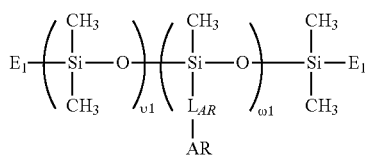

in which:
v1 is an integer of from 1 to 400;
ω1 is an integer of from 1 to 800;
$E_1$ is a monovalent radical of

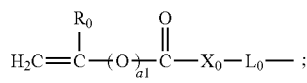

$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

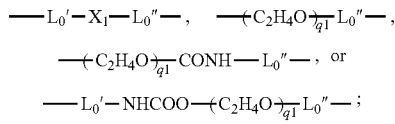

$L'_0$ is a $C_2$-$C_8$ alkylene divalent radical;
$L''_0$ is a $C_3$-$C_8$ alkylene divalent radical;
$X_1$ is —O—, —$NR_{N1}$—, —NHCOO—, —OCONH—, —$CONR_{N1}$—, or —$NR_{N1}$CO—;
q1 is an integer of 1 to 10;
AR is an aryl radical;
$L_{AR}$ is a divalent radical of

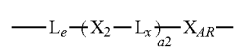

$L_e$ is a divalent radical of

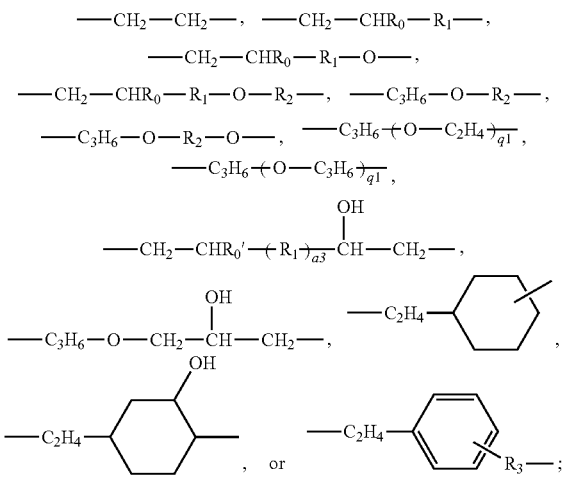

a2 is zero or 1 or 2;
a3 is zero or 1;
$R_1$ is a linear or branched $C_1$-$C_{10}$ alkylene divalent radical which is optionally substituted with $C_1$-$C_4$ alkoxy group, hydroxyl group, carboxyl group, amino group, oxo group, or combinations thereof;
$R_2$ is a linear or branched $C_1$-$C_{10}$ alkylene divalent radical;
$R_3$ is a direct bond or a linear or branched $C_1$-$C_4$ alkylene divalent radical;
$X_{AR}$ and each $X_2$ independently of others are a covalent bond, a linear or branched $C_1$-$C_4$ alkylene divalent radical, or a covalent linkage of

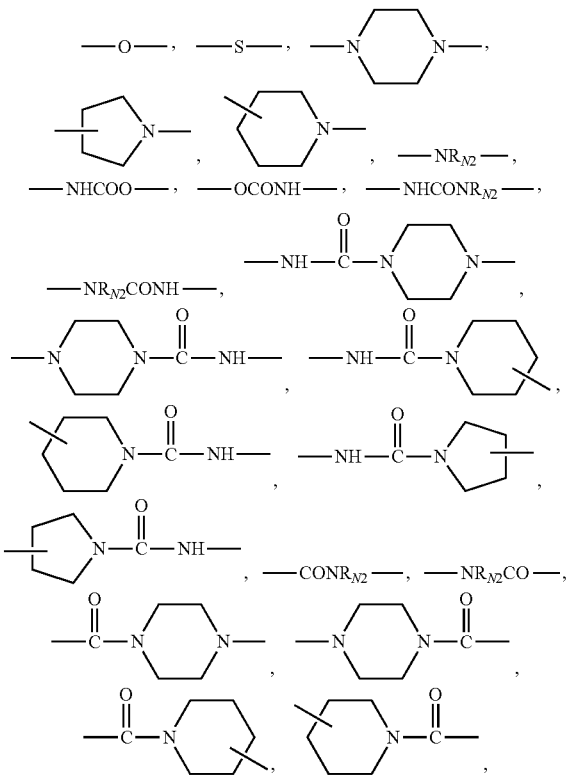

-continued

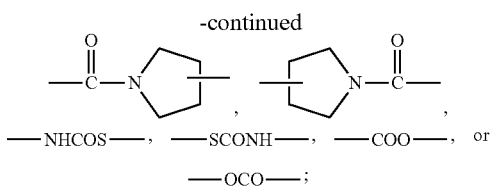

—NHCOS—, —SCONH—, —COO—, or —OCO—;

$R_{N2}$ is hydrogen, a linear or branched $C_1$-$C_6$ alkyl, cyclohexyl, cyclopentyl, a substituted or unsubstituted phenyl, or a substituted- or unsubstituted-phenyl-$C_1$-$C_6$ alkyl;

each $L_x$ independently is a linear or branched $C_1$-$C_{10}$ alkylene divalent radical which optionally has one or more hydroxyl or $C_1$-$C_4$-alkoxy groups or $C_1$-$C_4$-acylamino groups,

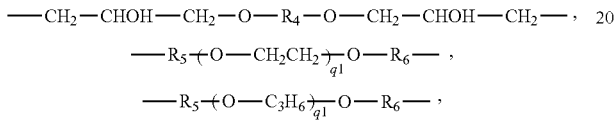

or a divalent radical which optionally has one or more hydroxyl or $C_1$-$C_4$-alkoxy groups and is obtained by removal of two hydrogen atoms from two different atoms of a hydrocarbon that has up to 20 carbon atoms and comprises at least one divalent radical selected from the group consisting of cycloalkylene radical, substituted cycloalkylene radical, phenylene radical, substituted phenylene radical, cyclo heteroalkylene radical, and substituted cyclo heteroalkylene radical; and each $R_4$, $R_5$ and $R_6$ independent of one another are a linear or branched $C_1$-$C_{10}$ alkylene divalent radical which has zero or one hydroxyl group.

8. The polysiloxane vinylic crosslinker of claim 7, wherein in formula (1) v1 is an integer of from 3 to 350.

9. The polysiloxane vinylic crosslinker of claim 7, wherein in formula (1) ω1 is an integer of from 5 to 700.

10. The polysiloxane vinylic crosslinker of claim 7, wherein in formula (1) a1 is zero.

11. The polysiloxane vinylic crosslinker of claim 10, wherein formula (1) $X_0$ is O.

12. The polysiloxane vinylic crosslinker of claim 10, wherein formula (1) $X_0$ is $NR_{N1}$.

13. The polysiloxane vinylic crosslinker of claim 7, wherein in formula (1) ω1/(v1+ω1) is from about 0.30 to about 0.95.

14. The polysiloxane vinylic crosslinker of claim 7, wherein in formula (1) AR is a phenyl group, a substituted phenyl group, a naphthyl group, a substituted naphthyl group, an anthracenyl group, a substituted anthracenyl group, a phenanthryl group, or a substituted phenanthryl group.

15. The polysiloxane vinylic crosslinker of claim 7, wherein in formula (1) AR is a monovalent radical of

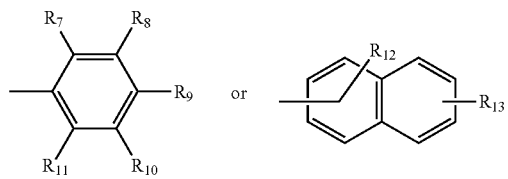

in which $R_7$, $R_8$, $R_9$, $R_{10}$, $R_{11}$, $R_{12}$, and $R_{13}$ independent of one another are H, Cl, Br, F, $CF_3$, $CCl_3$, $C_1$-$C_5$ alkyl, $C_1$-$C_5$ alkoxy, $C_2$-$C_5$ acyloxy, OH, phenyl, phenoxy, benzyloxy, phenylcarbonyl, phenoxycarbonyl, phenylcarboxy (phenylcarbonyloxy), or naphthyl.

16. An insert which is made of a hydrophobic crosslinked polymeric material comprising repeating units of a polysiloxane vinylic crosslinker of claim 2.

17. An embedded silicone hydrogel contact lens comprising a silicone hydrogel bulk material and an insert of claim 16, wherein the insert is fully or partially embedded within the silicone hydrogel bulk material.

18. A silicone hydrogel contact lens, comprising a silicone hydrogel bulk material which comprises repeating units of a polysiloxane vinylic crosslinker of claim 2.

19. An embedded silicone hydrogel contact lens comprising a silicone hydrogel bulk material and an insert which is made of a hydrophobic crosslinked polymeric material comprising repeating units of a polysiloxane vinylic crosslinker of claim 7.

20. A silicone hydrogel contact lens, comprising a silicone hydrogel bulk material which comprises repeating units of a polysiloxane vinylic crosslinker of claim 7.

* * * * *